US010209565B2

(12) United States Patent
Fukuda et al.

(10) Patent No.: US 10,209,565 B2
(45) Date of Patent: Feb. 19, 2019

(54) REFLECTION MEMBER, ILLUMINATION DEVICE, SURFACE LIGHT SOURCE DEVICE, DISPLAY DEVICE, AND ELECTRONIC EQUIPMENT

(71) Applicant: Enplas Corporation, Kawaguch-shi, Saitama (JP)

(72) Inventors: Yasuyuki Fukuda, Kawaguchi (JP); Yuta Kodama, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 15/597,321

(22) Filed: May 17, 2017

(65) Prior Publication Data

US 2017/0363910 A1 Dec. 21, 2017

(30) Foreign Application Priority Data

Jun. 15, 2016 (JP) ................. 2016-119240

(51) Int. Cl.
| | | |
|---|---|---|
| G02F 1/1335 | (2006.01) |
| F21V 3/00 | (2015.01) |
| F21V 7/04 | (2006.01) |
| F21V 7/00 | (2006.01) |
| F21Y 105/16 | (2016.01) |
| F21Y 115/10 | (2016.01) |

(52) U.S. Cl.
CPC .......... *G02F 1/133611* (2013.01); *F21V 3/00* (2013.01); *F21V 7/0083* (2013.01); *F21V 7/04* (2013.01); *G02F 1/133603* (2013.01); *G02F 1/133605* (2013.01); *F21Y 2105/16* (2016.08); *F21Y 2115/10* (2016.08)

(58) Field of Classification Search
CPC ......... G02F 1/133611; G02F 1/133603; G02F 1/133605; F21V 3/00; F21V 7/04; F21V 7/0083; F21Y 2115/10; F21Y 2105/16
See application file for complete search history.

(56) References Cited

U.S. PATENT DOCUMENTS

| | | | | |
|---|---|---|---|---|
| 2013/0148035 A1* | 6/2013 | Shimizu | ............ | G02F 1/133605 348/739 |
| 2014/0140051 A1* | 5/2014 | Takatori | ................. | F21V 3/049 362/224 |
| 2015/0009679 A1* | 1/2015 | Seki | ....................... | G02B 7/022 362/307 |
| 2016/0077244 A1* | 3/2016 | Saito | ....................... | G02B 3/08 362/311.06 |
| 2017/0343187 A1* | 11/2017 | Nakamura | ................ | F21V 7/04 |

FOREIGN PATENT DOCUMENTS

| | | |
|---|---|---|
| JP | 2010-205698 | 9/2010 |
| JP | 2011-090949 | 5/2011 |

* cited by examiner

*Primary Examiner* — Tracie Y Green
(74) *Attorney, Agent, or Firm* — William C. Schrot; AuerbachSchrot LLC

(57) ABSTRACT

The present invention relates to illumination techniques and a reflection member that receives light from a light source and forms an irradiated area having a substantially polygonal shape in an irradiated plane, and an illumination device, a surface light source device, a display device, electronic equipment and the like using the same.

19 Claims, 17 Drawing Sheets

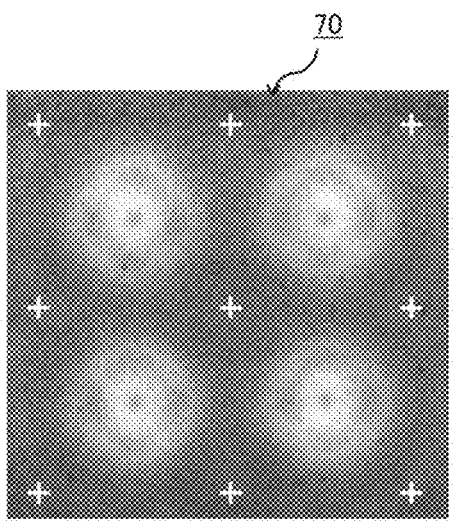
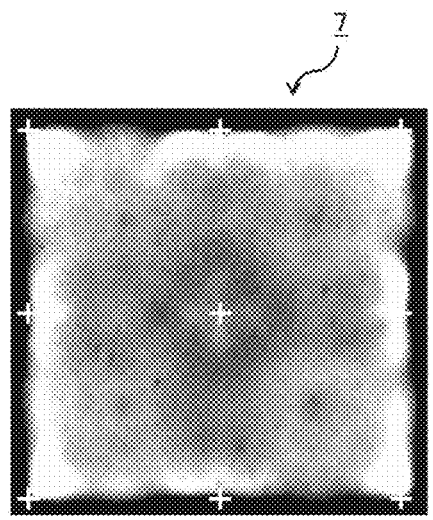
Fig. 19A                    Fig. 19B

REFLECTION MEMBER, ILLUMINATION DEVICE, SURFACE LIGHT SOURCE DEVICE, DISPLAY DEVICE, AND ELECTRONIC EQUIPMENT

CROSS REFERENCE TO RELATED APPLICATIONS AND CLAIM TO PRIORITY

This Application is based on Japanese Application No. JP2016-119240, filed Jun. 15, 2016, which application is herein incorporated by reference in its entirety and to which priority is claimed.

TECHNICAL FIELD

The present invention relates to illumination techniques, and in particular relates to a reflection member that receives light from a light source and forms an irradiated area having a substantially polygonal shape in an irradiated plane, and an illumination device, a surface light source device, a display device, electronic equipment and the like using the same.

BACKGROUND ART

A surface light source device has been known in which a plurality of light emitting diodes (LEDs) is arranged in a matrix manner. The surface light source device is used as, for example, illumination means (back light) of a liquid crystal display device, and illuminates a liquid crystal display panel from its back-surface side in a planar manner.

In such a surface light source device (direct type in which LEDs are arrayed on the back-surface side of a liquid crystal display panel), a technique of local dimming (area-by-area light-adjustment control) has been known that improves contrast ratio between different divided areas in the same screen or reduces power consumption by separately controlling light intensity of the LEDs.

To perform local dimming control, techniques have been proposed for controlling light distribution of an LED by using a light flux controlling member having a rectangular shape (rectangular lens), or for adjusting luminance unevenness by arranging in the front side of an LED a reflection sheet (flatter) in which a plurality of small holes is provided.

As a surface light source device that enables local dimming control, an illuminator capable of illuminating a desired portion of a translucent light diffusion sheet with a clear outline has been proposed (e.g., see Patent Literature 1). The illuminator described in Patent Literature 1 is used in a liquid crystal display device, an illumination device and the like, includes a light reflecting member, a translucent light diffusion sheet, and light sources, and is supposed to be able to suppress interference of light emitted from the light sources arranged in respective recesses adjacent to each other on the light reflecting member.

As a surface light source device, an illumination device has also been known that reflects light from a light source by a concave mirror to irradiate a liquid crystal display panel with the light (e.g., see Patent Literature 2). According to the illumination device described in Patent Literature 2, it is supposed that independent luminance control for each divided area is possible, and that the shape of the light flux can be made to be a substantially square shape similar to the shape of the divided areas.

CITATION LIST

Patent Literature

Patent Literature 1: Japanese Unexamined Patent Publication No. 2011-90949

Patent Literature 2: Japanese Unexamined Patent Publication No. 2010-205698

SUMMARY OF INVENTION

Technical Problem

In the case of using a rectangular lens, overlapping of rectangular light fluxes due to positional deviation, distortion, or the like of the rectangular lens readily causes luminance unevenness. Furthermore, since the rectangular lens needs to be designed in three dimensions and feedback in design is difficult, a design cost increases, which is another problem. Although using a flatter can reduce the number of LEDs, the overall cost for manufacturing a backlight increases, which is also a problem.

The illuminator (see FIG. 25) described in Patent Literature 1 is composed of: a light reflecting member A in which a number of recesses 2 of an inverted truncated quadrangular pyramid shape are arranged lengthwise and crosswise on a thermoplastic resin; a light source disposed at a bottom surface portion 21 of the recess 2; and a translucent light diffusion sheet, so as to illuminate a desired portion of the translucent light diffusion sheet with a clear outline.

However, in the configuration of the recess 2 of an inverted truncated quadrangular pyramid shape described in Patent Literature 1, the inclination of a connection portion $22b'$ of an isosceles triangle along the direction of the diagonal line of the recess 2 having a plan view rectangular shape inevitably becomes gentle as compared with the inclination of a peripheral wall portion $22a$. Consequently, the light emitted from the light source provided at the center of the bottom surface portion 21 of the recess 2 toward the connection portion $22b'$ is reflected at a shallow angle at the inclined surface of the connection portion $22b'$, so that the light is difficult to reach the translucent light diffusion sheet provided in the front direction of the recess 2 (reflection direction of light). Consequently, in the light reflecting member described in Patent Literature 1, when making the desired portion of the translucent light diffusion sheet to be a rectangular shape is desired, the four corners of the desired portion fail to obtain sufficient brightness. That is, the illuminator of Patent Literature 1 is difficult to obtain an irradiated area having a precise and uniform rectangular shape. Moreover, with reference to examples described in Patent Literature 1, boundaries of a rectangular irradiated area can be viewed, which indicates failure of uniform surface illumination.

In this regard, a concave mirror 41 (see FIG. 26) in the illumination device described in Patent Literature 2 has a plan view square shape, and the curvatures (K3, K4) of the concave portion in the diagonal line directions of the square are set to be smaller than the curvatures (K1, K2) of the concave portion in the horizontal and vertical directions of the square so as to achieve conversion of a light flux of a substantially circle shape into a light flux of a shape similar to a square shape.

However, the illumination device described in Patent Literature 2 presupposes that the light source is arranged on the side of the irradiated plane with respect to the concave mirror 41. Consequently, when making the area of the concave mirror 41 larger is desired, the distance between the light source and the concave mirror 41 needs to be increased, making the illumination device itself thick. Therefore, the illumination device described in Patent Literature 2 is difficult to increase the area of the divided area while keeping its thickness thin so as to reduce the number of light sources to be mounted.

The present invention has been conceived in the light of the above problems, and the object thereof is to provide a reflection member, an illumination device, a surface light source device, a display device, and electronic equipment capable of at least partially solving the above problems.

Solution to Problem

To solve the above problems, a reflection member of the present invention is a reflection member for reflecting light emitted from a light source. The reflection member includes at least one polygonal cell of a polygonal shape in plan view, and the polygonal cell has: a center bottom portion on which the light source is arranged; and an inclined portion around the center bottom portion which is inclined to be higher than the center bottom portion. On at least a portion of the inclined portion, a reflection area configured to reflect some of the light emitted from the light source in a direction in which a vertex close to the reflection area in plan view is arranged is provided.

Also, in the reflection member, at least one reflection area is provided on the inclined portion in an area of a plan view triangle AOB defined by three vertices, i.e., a vertex A of the polygonal cell, a center O of the polygonal cell, and a midpoint B of a side adjacent to the vertex A of the polygonal cell, and the reflection area may include a reflection surface inclined to be lower toward a side AO of the plan view triangle AOB. The inclined portion has a vertex-portion inclined surface including the side AO and a side-portion inclined surface provided between two of the vertex-portion inclined surfaces, and the reflection area may be provided on the side-portion inclined surface. Furthermore, the inclined portion has a vertex-portion inclined surface including the side AO and a side-portion inclined surface provided between two of the vertex-portion inclined surfaces, and the reflection area may be provided on the vertex-portion inclined surface.

In the reflection member, it is also preferable that a position of a vertex of the polygonal cell be higher than a position of a midpoint of a side of the polygonal cell. It is also preferable that the reflection member include a plurality of the polygonal cells, and an outer rim of each polygonal cell be arranged to be adjacent to each other.

An illumination device of the present invention comprises a light source and the reflection member. The illumination device of the present invention may comprise a light flux controlling member for controlling light emitted from the light source to be a light flux of a predetermined light distribution state. A surface light source device of the present invention comprises the illumination device and a diffusion member provided on a light emission side of the illumination device. A display device of the present invention comprises the surface light source device and an illuminated member which is irradiated with the light from the surface light source device. Electronic equipment of the present invention comprises the display device as a display unit.

Advantageous Effects of Invention

According to the reflection member of the present invention, a reflection area configured to reflect some of the light emitted from the light source or the light emitting device (the light source and the light flux controlling member) in the direction in which the vertex close to the reflection area in plan view is arranged is provided, making it possible to increase light intensity near vertices. This makes it possible to from an irradiated area having a substantially polygonal shape with a higher uniformity on the irradiated plane. The illumination device and the surface light source device of the present invention make it possible to form an irradiated area of a desired polygonal shape with a higher uniformity. Moreover, the display device of the present invention makes it possible to form a display area of a desired polygonal shape, and enable precise local dimming control. Other effects will be described in Detailed Description.

BRIEF DESCRIPTION OF DRAWINGS

FIG. 19A and FIG. 19B are diagrams that emphasize unevenness by subjecting the diagrams shown in FIGS. 18A and 18B to image processing, respectively;

DETAILED DESCRIPTION

Summary of Invention

[Reflection Member]

Figure 1:
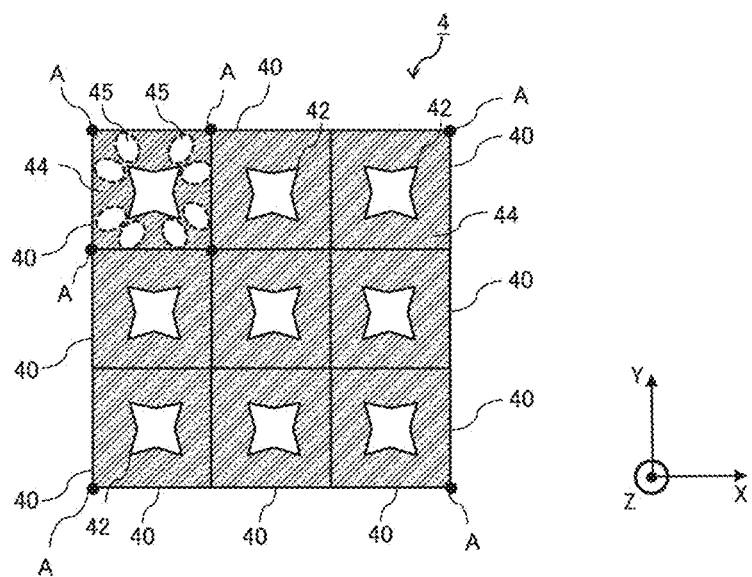
FIG. 1 is a schematic plan view of a reflection member according to an embodiment of the present invention.
Figure 2:
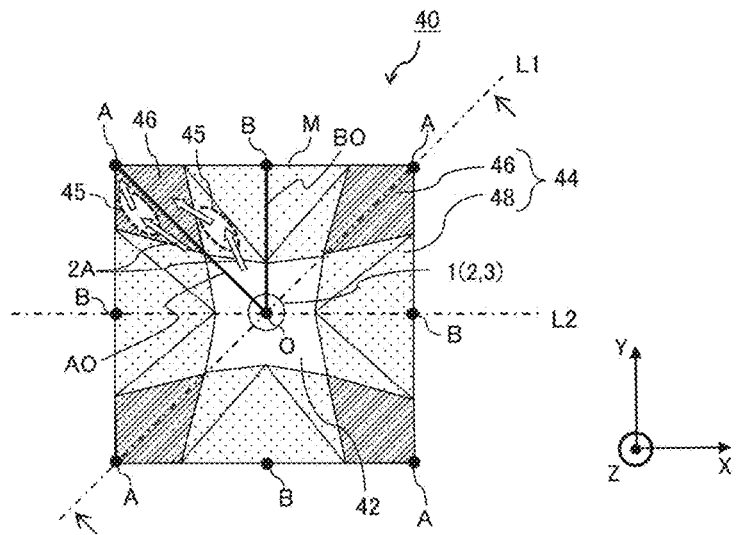
FIG. 2 is a schematic plan view of one polygonal cell of the reflection member shown in FIG. 1.

FIG. 1 is a schematic plan view of a reflection member 4 according to an embodiment of the present invention. FIG. 2 is a schematic plan view of one rectangular cell 40 of the reflection member 4 shown in FIG. 1. Herein, provided that dimensions of the reflection member are indicated by width (X axis direction), length (Y axis direction), and height (Z axis direction), Z axis becomes parallel to an optical axis. An irradiated plane is any XY plane in the irradiation direction of light reflected by the reflection member 4, and is used for specifying a shape and area of an irradiated area, a shape of irradiation light, and the like. Furthermore, a view from the side of the irradiated plane in a Z axis direction is called a "plan view", and a view from a direction perpendicular to the Z axis direction is called a "cross-sectional view". Note that, although FIGS. 1 and 2 are diagrams for illustrating the principle of the present invention, and are examples where a rectangular cell is employed as one of polygonal cells, the reflection member of the present invention is not limited to the shape, size, and arrangement shown in FIGS. 1 and 2.

The reflection member 4 of the present invention reflects light emitted from a light source 2 (or a light emitting device 1 including the light source 2 and a light flux controlling member 3) to form an irradiated area of a substantially polygonal shape in an irradiated plane perpendicular to the optical axis of the light source 2. The reflection member 4 has at least one polygonal cell 40, and the polygonal cell 40 has a center bottom portion 42 on which the light source 2 (or the light emitting device 1) is arranged, and an inclined portion 44 (area indicated by hatching in FIG. 1) around the center bottom portion, which is inclined to be higher than the center bottom portion, and a reflection area is provided in the inclined portion. The reflection area 45 is configured to reflect some 2A of the light emitted from the light source 2 in a direction in which a vertex A of the polygonal cell 40 close to the reflection area 45 in plan view is arranged. That the light is reflected in the direction in which vertex A is arranged is not limited to the case of reflecting toward vertex A, and includes the case of deflecting the angle of radially emitted light in plan view on the vertex side. The reflection member 4 of the present invention can thus increase the intensity of the light toward the vicinity of each vertex A of the rectangular cell 40 so as to irradiate the irradiated plane with a light flux of a polygonal shape corresponding to the polygonal cell, making it possible to enable illumination having high uniformity.

It is preferable that the reflection member 4 be a thin sheet and be flat as a whole. The reflection member of the present invention may have a configuration in which a plurality of polygonal cells 40 is arrayed (see FIG. 1), or may be configured with one polygonal cell 40 (see FIG. 2).

The polygonal cell 40 has a polygonal shape (typically a rectangular shape) in plan view, and its outer rim is high and the center bottom portion is low in cross-sectional view by the center bottom portion 42 and the inclined portion 44 provided around the center bottom portion 42, so that the polygonal cell 40 has a overall shape recessed at the center. The outer rim of the polygonal cell 40 is composed of each vertex A of the polygonal shape and each side M connecting two of the vertices A. The outer rim (side M) of the polygonal cell 40 is a portion corresponding to the outline composing the polygonal shape in plan view, and is formed by a straight line. However, in cross-sectional view, it is not limited to a straight line between the vertices A, and may be a broken line, a curve, or a combination thereof in which its height in Z axis direction varies along the way. It is preferable that center point O of the polygonal cell 40 and the center point of the center bottom portion match in plan view, and it is preferable that the optical axis of the light source 2 (or the light emitting device 1) be arranged at the center point O. The plane defined by XY at the center bottom portion shall be a reference surface (e.g., reference symbol S of FIG. 6B).

Figure 3A:
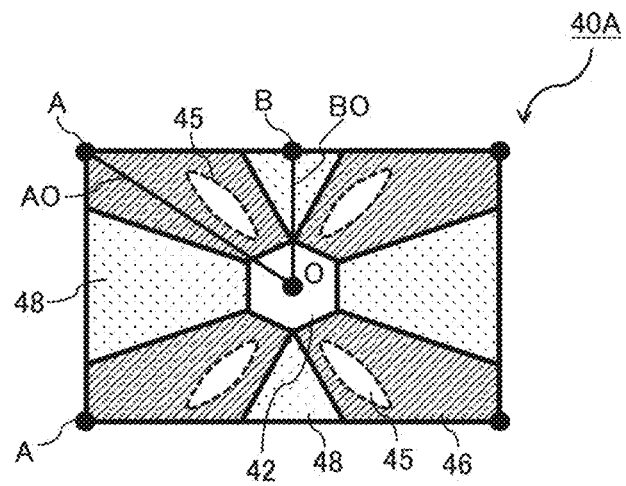
FIG. 3A, FIG. 3B, and FIG. 3C show configuration examples of the polygonal cell.
Figure 3B:
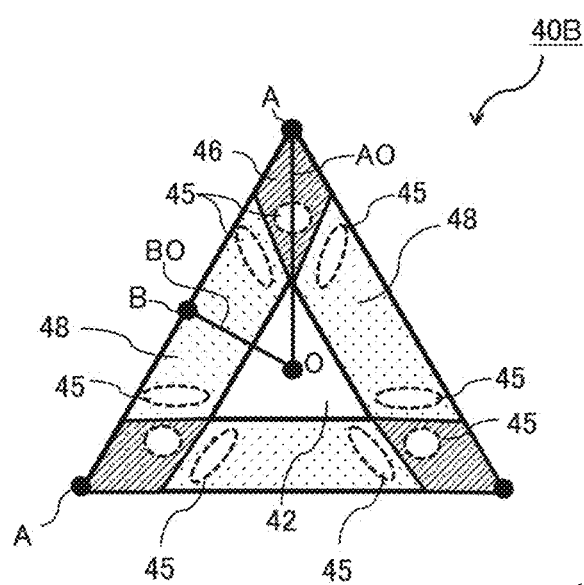
Figure 3C:
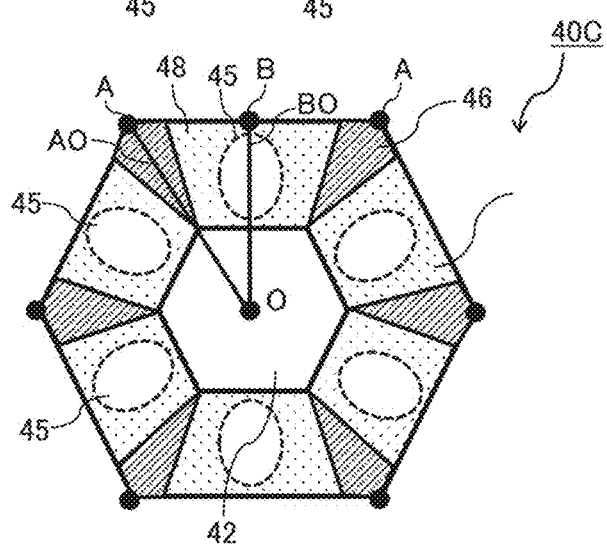

As the shape of the polygonal cell 40, various shapes such as triangle, quadrangle, pentagon, and hexagon can be employed (see FIG. 3A to 3C). When the reflection member 4 is composed of a plurality of polygonal cells 40, it is preferable that the shapes and sizes of the respective polygonal cells 40 be identical, but when a plurality of light sources different in brightness is implemented, the shapes and sizes of the respective polygonal cells 40 may be varied depending on the brightness of each light source. Furthermore, when the reflection member 4 is composed of a plurality of cells 40, it is preferable that triangle (including equilateral triangle, rectangular triangle, isosceles triangle, etc.), quadrangle (including square, rectangle, parallelogram, etc.), or hexagon (including regular hexagon, parallel hexagon, etc.) is used as the shape of the polygonal cells 40 because the outer rims of the respective polygonal cells 40 can be arranged adjacent to each other so as to form a plane without gaps. Specifically, configuring the polygonal cells 40 as rectangular cells enables the reflection member itself composed of the plurality of polygonal cells 40 to have a rectangular shape, which is more preferable. For example, as shown in FIG. 1, when the reflection member 4 includes the plurality of rectangular cells 40 each having a square shape in plan view, and the plurality of rectangular cells 40 are arranged in a matrix manner such that outer rims of the rectangular cells are adjacent to each other without gaps, the reflection member 4 itself can be made to have a rectangular shape in plan view as a whole. The polygonal cell 40 may be a substantially regular polygon having sides of almost the same length, or may have a deformed shape having sides of different lengths depending on the purpose and aspects of its usage. Note that each vertex A of the polygonal cell may be a corner composed of two straight lines or may be rounded.

The center bottom portion 42 of the polygonal cell 40 is an area on which the light source 2 (or the light emitting device 1) is arranged, and may have the size substantially identical to that of the light source 2 (or the light emitting device 1), or may be larger than that of the light source 2 (or the light emitting device 1). Furthermore, the center bottom portion 42 may be provided with one or more openings to implement the light source 2 (or the light emitting device 1). The center bottom portion 42 may employ an appropriate shape to form a desired inclined portion 44, and may employ various shapes in plan view including polygonal shape such as triangle, quadrangle, pentagon, and hexagon, star polygon such as cross shape, five-rayed star, and six-rayed star, circle shape, ellipse shape or a combination of the shapes (see FIGS. 3A to 3B).

The inclined portion 44 of the polygonal cell 40 has an inclined configuration to be higher than the center bottom, and the reflection area 45 configured to reflect some 2A of the light emitted from the light source 2 (or the light emitting device 1) in the direction in which the vertex A of the polygonal cell 40 close to the reflection area 45 in plan view is arranged. The inclined portion 44 may be formed by combining a plurality of flat surfaces or curved surfaces. In this case, a portion of the plurality of flat surfaces or curved surfaces functions as the reflection area 45 (e.g., shaded areas in FIG. 5).

It is preferable that at least one reflection area 45 be provided on the inclined portion in the area of a plan view triangle AOB defined by three vertices, i.e., the vertex A of the polygonal cell, a center O of the polygonal cell, and a midpoint B of a side M adjacent to the vertex A of the polygonal cell. Furthermore, the reflection area 45 includes a reflection surface inclined to be lower toward a side AO of the plan view triangle AOB, and reflects, by the reflection surface, some 2A of the emitted light in the direction in which the vertex A is arranged. Such a reflection area can be formed by providing a "bump" lower than that of the vertex A in the area between the side AO and a side BO. The reflection area can also be formed by providing, in the area of plan view triangle AOB, at least one mountain-fold boundary inclined to reflect light from the center O to the vertex A close to the mountain-fold boundary in plan view. The side AO and the side BO are a straight line in plan view, but are not a straight line in cross-sectional view, and are formed by a broken line, a curved line, or a combination thereof so that sides of A and B are high (see FIGS. 6A and 6B). Note that the reflection area 45 only needs to be provided in at least one area (triangle AOB) of the two sides M adjacent to the vertex A as shown in FIG. 3A, but when the polygonal cell is symmetric with respect to the side AO, it is preferable that the reflection area 45 be provided on the both sides of the vertex A. Also, a portion of the reflection area 45 may protrude from the area of the plan view triangle AOB.

The inclined portion 44 may have a vertex-portion inclined surface 46 including the side AO formed correspondingly to each vertex A of the polygonal cell 40. It is preferable that the vertex-portion inclined surface 46 include an area including the vertex A of the polygonal cell 40 and its vicinity (see FIGS. 2 and 3). One vertex-portion inclined surface 46 or a plurality of vertex-portion inclined surfaces 46 may be provided with respect to one vertex A. Furthermore, the inclined portion 44 may have a side-portion inclined surface 48 formed between two of the vertex-portion inclined surfaces 46 corresponding to respective vertices. It is preferable that the side-portion inclined surface 48 include the midpoint B of the side M of the polygonal cell 40 and its vicinity (see FIGS. 2 and 3). Note that the vertex-portion inclined surface 46 and the side-portion inclined surface 48 may be continuously formed.

The reflection area 45 may be provided on the vertex-portion inclined surface 46 (FIG. 3A), on the side-portion inclined surface 48 (FIG. 3C), or on both the vertex-portion inclined surface 46 and the side-portion inclined surface 48 (FIGS. 2 and 3B). Furthermore, the reflection area 45 does not necessarily need to orient the light emitted from the light source 2 in the direction of the vertex A by one time reflection. A plurality of reflection areas 45 may orient the emitted light in the direction of the vertex A little by little by repeating a plurality of reflections. Furthermore, it is preferable that the position of each vertex A of the polygonal cell 40 be higher than the position of the midpoints of the sides of the polygonal cell 40. Specifically, it is preferable that the vertex A be provided at the highest point on the outer rim of the polygonal cell 40 (see FIG. 6). Note that in the example shown in FIG. 4 to FIG. 6, the inclined angle at the maximum inclined portion of the vertex-portion inclined surface 46 is made larger than the inclined angle of the side-portion inclined surface 48. The light intensity near the vertex A may be increased by adjusting the inclined angles in this manner.

In the example shown in FIG. 2, four vertex-portion inclined surfaces 46 are provided correspondingly to respective four vertices A of the rectangular cell 40. The vertex-portion inclined surface 46 is configured to include vertex A. Moreover, the side-portion inclined surface 48 is provided between two of the vertex-portion inclined surfaces 46. The light source 2 is arranged at a center point O of the rectangular cell 40 (the center bottom portion 42).

Given that a line connecting the center point O and each vertex A of the rectangular cell 40 is a first baseline L1 (an A-A diagonal line), and a line connecting the center point O and each midpoint B, which divides each side M into two equal portions, of the rectangular cell 40 is a second baseline L2 (a B-B diagonal line), the vertex-portion inclined surface 46 is inclined such that its height becomes higher toward vertex A along the first baseline L1, and the side-portion inclined surface 48 is inclined such that its height becomes higher toward the midpoint B of the side M along the direction of the second baseline L2. However, the vertex-portion inclined surface 46 and the side-portion inclined surface 48 can be formed by combining a plurality of inclined surfaces and/or a plurality of curved surfaces, so that the inclination of the vertex-portion inclined surface 46 along the direction of the first baseline L1 and the inclination of the side-portion inclined surface 48 along the direction of the second baseline L2 may be not constant, and may be increased or decreased. Furthermore, the vertex-portion inclined surface 46 and the side-portion inclined surface 48 may include an area inclined such that their height become lower toward vertex A or midpoint B.

The reflection member 4 only needs to be made of a material having light reflectivity in an area that receives the light from the light source 2, and may be formed by, for example, subjecting a thermoplastic resin sheet to press working, vacuum processing, or pressure processing to give a predetermined shape of the polygonal cell, or may be formed by applying or evaporating a material having reflectivity on the surface of a base on which the polygonal cell of a predetermined shape is preliminarily formed. Furthermore, the surface of the reflection member may have light diffuseness.

In the example shown in FIGS. 1 and 2, a case is described in which a rectangular cell (almost square shape) is formed as an example of the polygonal cell 40, but the configuration of the polygonal cell 40 of the reflection member 4 of the present invention is not limited thereto, and may be, for example, rectangle, triangle, or hexagon in plan view as shown in FIGS. 3A to 3C, respectively.

A rectangular cell 40A shown in FIG. 3A has four pentagonal shaped vertex-portion inclined surfaces 46 in plan view provided correspondingly to respective four vertices A around a center bottom portion 42 of a hexagonal shape, and has four side-portion inclined surfaces 48 provided between adjacent two of the vertex-portion inclined surfaces 46. The reflection area 45 is provided in the area of a plan view triangle AOB on the long-side side of each vertex-portion inclined surface 46, and is configured to reflect some of the light emitted on the long-side side toward the side of the vertex A close to the long-side. A triangle cell 40B shown in FIG. 3B has three vertex-portion inclined surfaces 46 of a substantially rhombus shape in plan view provided correspondingly to respective three vertices A around a center bottom portion 42 of a triangular shape similar to the outer rim of the triangle cell 40B, and three side-portion inclined surfaces 48 provided between adjacent two of the vertex-portion inclined surfaces 46. The reflection area 45 is provided in each of the vertex-portion inclined surfaces 46 and the side-portion inclined surfaces 48 in the area of each plan view triangle AOB. A hexagonal cell 40C shown in FIG. 3C has six vertex-portion inclined surfaces 46 of a kite shape in plan view provided correspondingly to six vertices A around a center bottom portion 42 of a hexagonal shape similar to the outer rim of the hexagonal cell 40, and has six side-portion inclined surfaces 48 provided between adjacent two of the vertex-portion inclined surfaces 46. The reflection area 45 is provided on the side-portion inclined surface 48 (across adjacent side-portion inclined surfaces 48) in the area of each plan view triangle AOB.

[Illumination Device]

Figure 8:
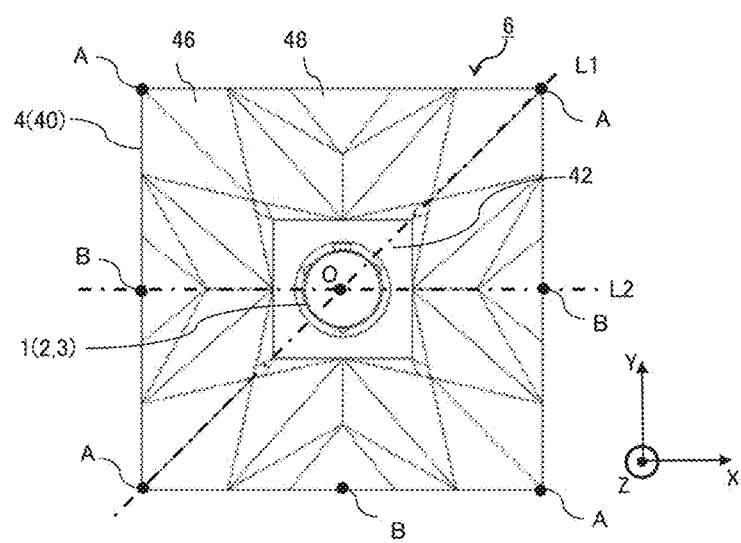
FIG. 8 is a schematic plan view of an example of an illumination device of the present invention.

An illumination device of the present invention (e.g., see FIGS. 8 and 9) is a device in which the light source 2 or the light emitting device 1 (the light source 2 and the light flux controlling member 3) for radiating light of a predetermined distribution state and the above reflection member 4 (polygonal cell 40) are combined, and is a device for, for example, forming an irradiated area of substantially polygonal shape on an irradiated plane by converting a light flux of a substantially circle shape in XY cross section into a light flux of a substantially polygonal shape in XY cross section. It is preferable that the Light source 2 or the light emitting device 1 be arranged at (the center point O of) the center bottom portion 42 of the polygonal cell 40 of the reflection member 4 such that its optical axis becomes perpendicular to the reference surface. Note that the light source 2 or the light emitting device 1 may be arranged in the opening provided on the center bottom portion 42 of the polygonal cell 40 as shown in FIGS. 8 and 9, or may be arranged to cover the opening for implementing a terminal of the light source 2 or the light emitting device 1 onto a substrate via the opening.

The illumination device 6 can provide divided areas different in contrast ratio by controlling light intensity of the light source 2 of the individual polygonal cell 40 when the irradiated area has a shape in which a plurality of polygons is combined due to reflection of light from a plurality of polygonal cells 40. A divided area may be a dark portion where by turning the light source 2 off.

The light source 2 can employ an LED, a bulb, a xenon lamp, a semiconductor laser, an organic EL element, an ultracompact fluorescent lamp, or the like.

The light flux controlling member 3 is arranged with the light source 2, and controls the light emitted from the light source 2 to be a light flux of a predetermined distribution state. When an LED is employed as the light source 2 (hereinafter, also referred to as LED light source 2), the LED light source 2 has, unlike normal bulbs, specific directivity. When the LED light source 2 is arranged at the center bottom portion 42 of the reflection member 4, light of a distribution state having the most intense peak in the optical axis direction (Z axis direction) is emitted from the LED light source 2. Thus, on the irradiated plane, a portion just above the light source is likely to become an intense luminescent spot, which is not preferable for uniform surface emission. Note that the light flux controlling member 3 is not needed when the light distribution state of the light source 2 itself has no problem as an illumination device.

In the present invention, the light emitting device 1 can be used including the light flux controlling member 3 for controlling light from the LED light source 2 to be a light flux of a light distribution state having a peak in a predetermined angle direction. It is preferable that the light flux controlling member 3 be a lens for controlling the light emitted from the LED to be light of a light distribution state having a peak in a direction of a predetermined angle with respect to the optical axis (parallel to Z axis) (not less than 45°, preferably not less than 60° (not more than 45°, more preferably not more than 30° with respect to XY plane), more preferably not more than the inclined angle of the side-portion inclined surface). Arrangement of the light emitting device 1 at the center bottom portion 42 of the polygonal cell 40 of the reflection member 4 makes it possible to effectively convert a light flux emitted toward the outside at a large angle with respect to optical axis R into a light flux of a substantially polygonal shape to form an irradiated area of a relatively precise polygonal shape on the irradiated plane.

The size of the reflection member 4, the shape and the size of the polygonal cell 40 forming the reflection member 4, the height of the outer rim of the polygonal cell 40, and the like are appropriately set depending on the light distribution state of the light source 2 or the light emitting device 1 to be arranged, the distance from the light source 2 or the light emitting device 1 to the irradiated plane (diffusion member), and the like, but it is preferable that the predetermined angle in the light distribution state be set to correspond to the height of the outer rim so that most of the light flux emitted from the light source 2 or the light emitting device 1 is applied onto the reflection member 4. This enables the illumination device 6 of the present invention to form an irradiated area of a polygonal shape with a highly uniform brightness.

[Surface Light Source Device and the Like]

Further, a surface light source device 7 of the present invention (e.g., see FIGS. 12 and 13) has at least the light source 2 or the light emitting device 1, the reflection member 4 (that is, the illumination device 6) and a diffusion member 5. The diffusion member 5 is provided on the light emission side of the illumination device 6, and formed by a translucent material. The surface light source device 7 of the present invention can form an irradiated area of a polygonal shape with a highly uniform brightness on, for example, the diffusion member 5.

The illumination device 6 and the surface light source device 7 of the present invention is applicable to, for example, a back light for a display panel, an illuminated signboard, an internally illuminated sign, and illuminating means, and specifically can be applied when making irradiation with light of a special shape.

Furthermore, a display device of the present invention includes the light source device 7 and an illuminated member which is irradiated with light from the surface light source device 7. The illuminated member is, for example, a liquid crystal panel, an illuminated signboard, or an internally illuminated sign. The display device of the present invention is capable of local dimming control for each specific irradiated area by the surface light source device 7, making it possible to display, for example, an obvious black color for each desired divided area of a liquid crystal display panel. Furthermore, the display device of the present invention can form an irradiated area of a polygonal shape with a highly uniform brightness for each divided area on the illumination member (display panel).

Furthermore, electronic equipment of the present invention includes such a display device as a display unit. Examples of the electronic equipment include, although not limited thereto, a mobile phone, a display device for car navigation system, a personal digital assistants (PDA), a mobile computer, a digital camera, a digital video camera, an in-vehicle equipment, an audio equipment, a portable game machine, and a signal.

Hereinafter, examples of the present invention will be described with reference to the drawings. However, the present invention is not limited to the following examples.

EXAMPLES

Figure 4:
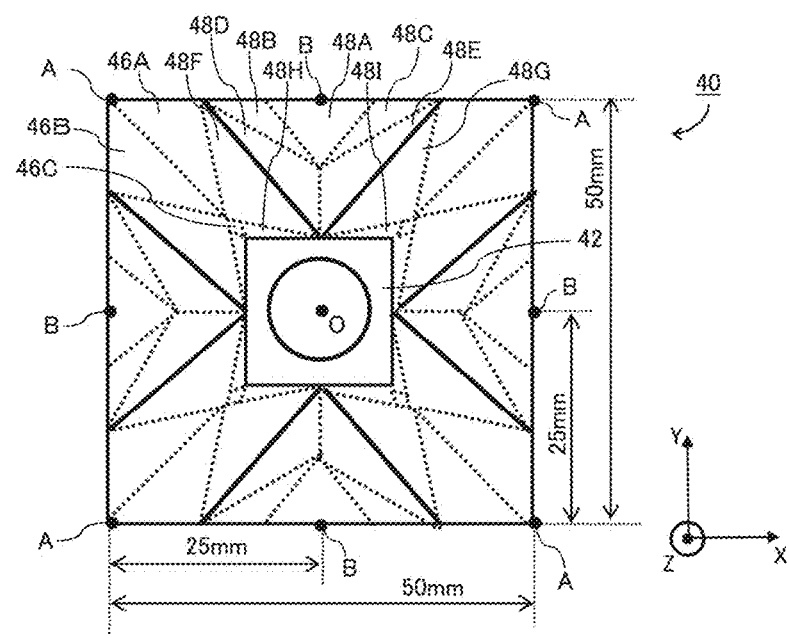
FIG. 4 is a plan view of an example of a rectangular cell.
Figure 5:
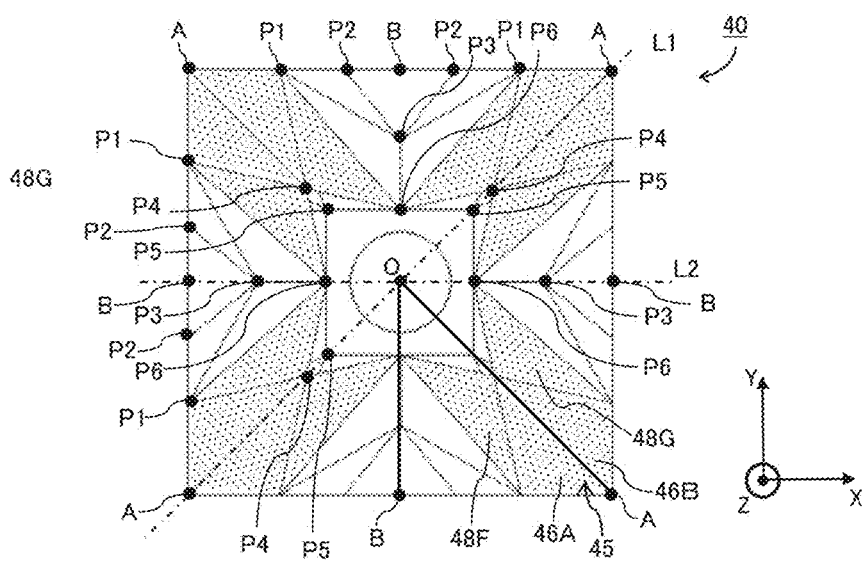
FIG. 5 shows reflection areas in the rectangular cell shown in FIG. 4.
Figure 6A:
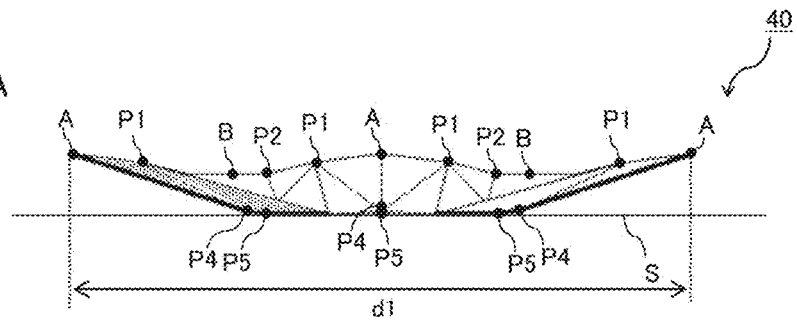
FIG. 6A and FIG 6B are schematic cross-sectional views along a first baseline L1 and a second baseline L2, respectively, of the rectangular cell shown in FIG. 5.
Figure 6B:
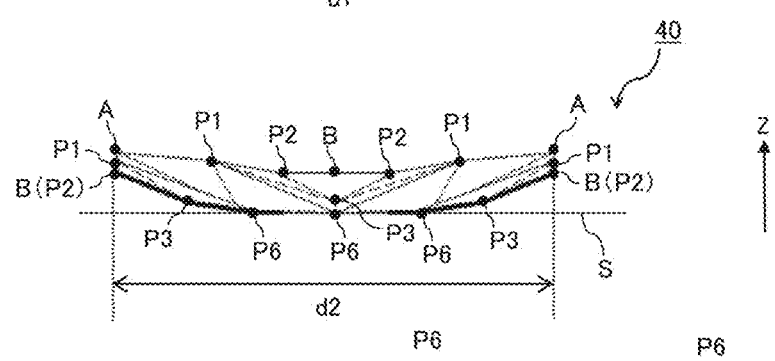
Figure 7:
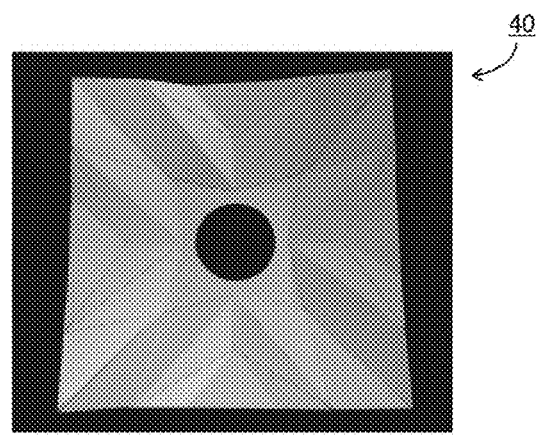
FIG. 7 is a photograph of an example of the rectangular cell.

FIG. 4 is a plan view of the rectangular cell 40 embodying the present invention. FIG. 5 shows the reflection areas 45 of the rectangular cell 40 shown in FIG. 4. FIG. 6A is a schematic cross-sectional view parallel to the first baseline L1, and FIG. 6B is a schematic cross-sectional view parallel to the second baseline L2 of the rectangular cell 40 shown in FIG. 5. FIG. 7 is a photograph of an example of the rectangular cell 40. As shown in FIG. 4 to FIG. 7, the rectangular cell 40 is sterically configured by combining a plurality of inclined plane areas (segments), but for ease of understanding, in FIG. 4, a mountain-fold boundary (boundary where the angle between surfaces of both planes (two adjacent contact planes in the case of curved surfaces) is larger than 180°) is designated by a solid line, and a valley-fold boundary (boundary where the angle between surfaces of both planes is smaller than 180°) is designated by a dotted line among boundaries of each plane area.

The rectangular cell 40 has a square shape of 50 mm×50 mm in its horizontal and vertical sizes in plan view, and the distance from a center point O to a midpoint B of each side (outer rim) M is 25 mm. The rectangular cell 40 includes the center bottom portion 42 of a square shape, and an inclined portion formed of a plurality of inclined surfaces 46A to 46C and 48A to 48I provided between the center bottom portion 42 and each side M. The inclined portion of the rectangular cell 40 is four-fold symmetric with respect to the center point O.

In FIG. 5, the vertex A, the midpoint B, and other points P1 to P6 correspond to respective points indicated by the same symbols in the cross-sectional views of FIG. 6. On the basis of FIG. 6, in the case of the rectangular cell 40 of this example, given that the heights of the vertex A, the midpoint B, the point P1, the point P2, the point P3, the point P4, the point P5, the point p6 and the center point O from the reference surface S (the center bottom portion 42) are h(A), h(B), h(P1), h(P2), h(P3), h(P4), h(P5), h(P6), and h(O), respectively, the following relation is satisfied: h(A)>h(P1)>h(P2)=h(B)>h(P3)>h(P4)>h(P5)=h(P6)=h(O). Specifically, h(A)=6.83 mmm, h(P1)=5.83 mm, h(P2)=h(B)=4.5 mm, h(P3)=1.25 mm, h(P4)=0.36 mm, and h(P5)=h(P6)=h(O)=0.0 mm.

In FIG. 4, since the inclined surfaces 46A, 46B, and 46C are the vertex-portion inclined surfaces 46 because they include a side AO, and four vertex-portion inclined surfaces 46 are provided correspondingly to respective vertices A. Inclined surfaces 48A to 48I arranged between the vertex-portion inclined surface 46 of a vertex and the vertex-portion inclined surface 46 of another vertex adjacent to that vertex form the side-portion inclined surface 48, and each of four side-portion inclined surfaces 48 is provided between two of the vertex-portion inclined surfaces 46.

The vertex-portion inclined surface 46A and the vertex-portion inclined surface 46B are symmetric with respect to the side AO, have an inclination so that the side AO side is low (the side AO is a valley-fold boundary), and are one of the reflection areas (reflection surfaces) 45 as shown in FIG. 5. Although including the side AO and reflecting some 2 A of the light emitted from the light source 2, the vertex-portion inclined surface 46C is a flat surface having the inclined angle same as the inclination of the side AO and does not reflect light in the direction in which the vertex A of the polygonal cell 40 close thereto in plan view is arranged, so that the vertex-portion inclined surface 46C is not the reflection area (reflection surface) of the present invention.

One side-portion inclined surfaces 48 is sterically configured by combining nine plane areas (triangle segments) 48A to 48I. The side-portion inclined surface 48F has a mountain fold boundary with respect to the side-portion inclined surface 48D, has an inclination so that the side AO side is low, and reflects some 2 A of the light emitted from the light source 2 in the direction in which the vertex A close thereto of the polygonal cell 40 in plan view is arranged, so that the side-portion inclined surface 48F is one of the reflection areas (reflection surfaces) 45 as shown in FIG. 5. Likewise, the side-portion inclined surface 48G has a mountain fold boundary with respect to the side-portion inclined surface 48E, and is one of the reflection areas (reflection surfaces) 45. In this manner, in the rectangular cell 40, at least one mountain fold boundary inclined to reflect the light from center O to vertex A close thereto in plan view is provided in the area of the plan view triangle AOB.

Note that each triangle segment of the vertex-portion inclined surface 46 and the side-portion inclined surface 48 may be not a flat surface, and all or some thereof may be formed by a curved surface. The three-dimensional shape of the vertex-portion inclined surface 46 and the side-portion inclined surface 48 shown in the drawings is only an example, and a desired inclination can be formed by combining segments of appropriate shapes.

Furthermore, as shown in FIG. 5, for each vertex A, triangle segments 46A and 46B of the vertex-portion inclined surface 46 and triangle segments 48F and 48G of the side-portion inclined surface 48 are formed as the reflection area 45 (shaded portion in FIG. 5). The reflection area 45 (triangle segments 46A, 46B, 48F, and 48G) is provided in the vertex-portion inclined surface 46 and the side-portion inclined surface 48 in the area of the plan view triangles AOB on the both sides of each of vertices A. In the cross-sectional view (FIG. 6A) at the first baseline L1 (side AO) in FIG. 5, although side AO is a straight line in plan view, side AO is formed by a straight line having a first inclined angle from the vertex A to the point P4, a straight line having a second inclined angle from the point P4 to the point P5, and a horizontal straight line from the point P5 to the center point O, the reflection areas 45 (reflection area 45 on the left side is shaded) with respect to respective vertices A on both left and right sides are upraised can be observed, and it is confirmed that the reflection area 45 is inclined with respect to side AO. Note that each vertex A of the rectangular cell 40 is located at the highest point in the outer rim of the rectangular cell 40 can be also confirmed from the cross-sectional views of FIGS. 6A and 6B.

Figure 25:
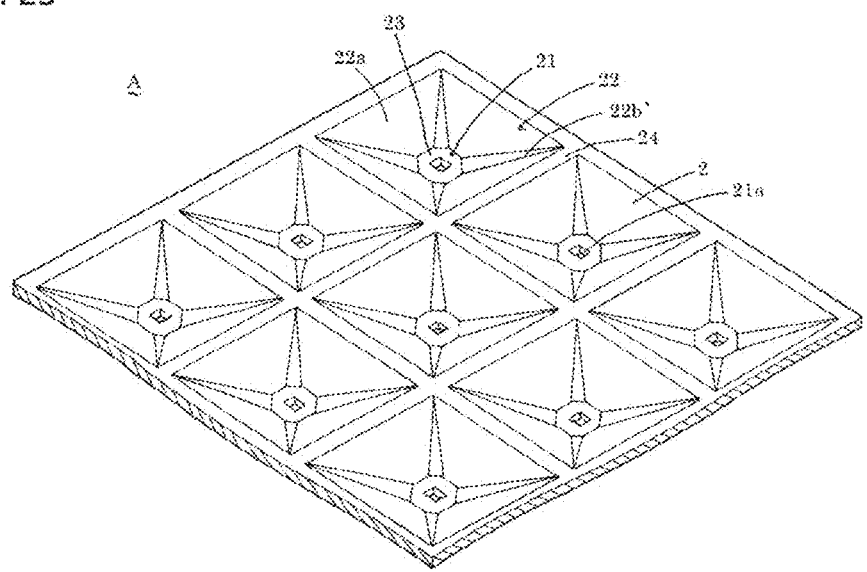
FIG. 25 shows a first conventional example, which is FIG. 8 cited from Patent Literature 1.

Herein, as the rectangular cell of the reflection member, according to a conventional method (e.g., see Patent Literature 1 and FIG. 25), for example, when a rectangular cell is configured having a dimple of an inverted truncated regular quadrangular pyramid shape, the height of the outer rim of the rectangular cell is constant, so that when a point light source is located at the center point of the rectangular cell and the light is radially emitted from the point light source, the elevation angle range of the light traveling in the direction of the first baseline (direction of vertex) and reflected by the inclined surface is narrower than the elevation angle range of the light traveling in the direction of the second baseline (direction of the midpoint of each side) and reflected by the inclined portion of the rectangular cell, reducing the rate of reflecting towered the side of an irradiated plane in the direction of the first baseline. In this manner, in the conventional method, brightness of the irradiated area in the irradiated plane fails to be constant, causing a bright portion and a dark portion in some cases. Specifically, the reflection member of the conventional rectangular cell causes dark portions at the four corners of the irradiated area, failing to display a precise rectangular shape.

In this regard, in the reflection member of the present invention, some of the light traveling to each side of the rectangular cell can be reflected in the direction in which the vertex A of the polygonal cell 40 close to the reflection area 45 is arranged by the reflection area 45, making it possible to increase the light intensity at the four corners of irradiated area, which used to be dark in the case of conventional rectangular cell, making it possible to enhance uniformity.

According to an aspect of the reflection member of the present invention, vertex A is positioned higher than the midpoint B of each side in the outer rim of the rectangular cell, making it possible to increase the elevation angle range of the light traveling in the direction of the first baseline L1 and reflected at the inclined surface as compared with conventional reflection member, making it possible to reflect light at the vertex-portion inclined surface also in the case of the light emitted at relatively high elevation angle. In this manner, according to the aspect of the reflection member of the present invention, in addition to the effect of the above reflection area, most of the light emitted from the light source and traveling in the direction of the first baseline can be received at the vertex-portion inclined surface to reflect the light toward the irradiated plane. This makes it possible to form an irradiated area of a substantially rectangular shape similar to the shape of the rectangular cell in the irradiated plane, making it possible to provide illumination of a relatively precise rectangular shape with no dark points at its four corners.

Figure 26:
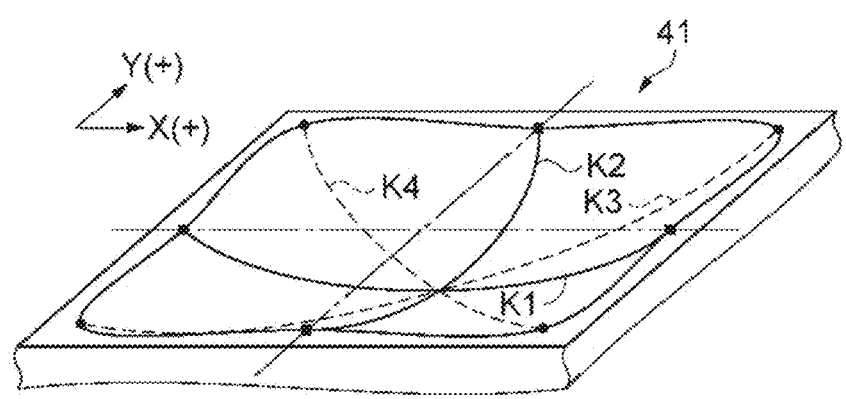
FIG. 26 shows a second conventional example, which is FIG. 7C cited from Patent Literature 2.

Furthermore, the distance from the center bottom portion 42 on which the light emitting device 1 is disposed in the reflection member 4 to the diffusion member 5 can be made shorter, which is different from conventional methods (e.g., see Patent Literature 2 and FIG. 26), making it possible to provide a thin illumination device and a thin surface light source device. Furthermore, the area of the rectangular cell can be made relatively larger, making it possible to configure an illumination device and a surface light source device having a large area with a small number of mounted light sources (LEDs). Furthermore, the light emitted from adjacent rectangular cells does not overlap in an irradiated plane, making it possible to control luminance for each divided area in the irradiated plane.

Figure 9A:
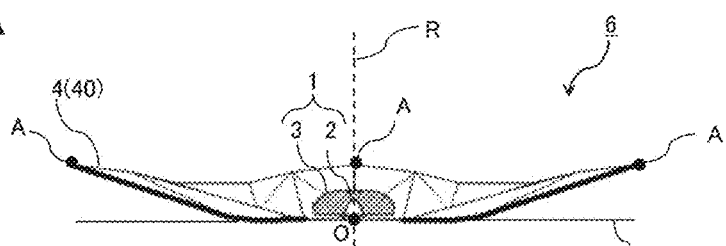
FIG. 9A and FIG. 9B are schematic cross-sectional views along a first baseline L1 and a second baseline L2, respectively, of the illumination device shown in FIG. 8.
Figure 9B:
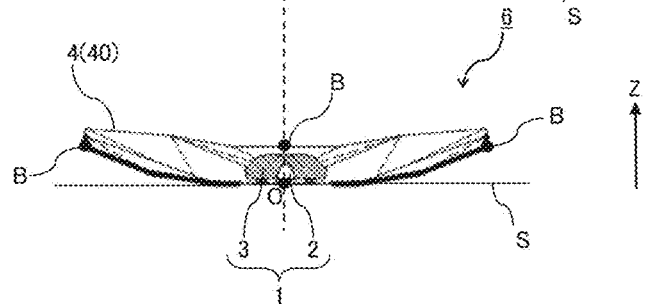

FIG. 8 is a schematic plan view of an example of the illumination device 6 of the present invention, and is a device in which the light emitting device 1 is combined with the reflection member (one rectangular cell 40) shown in FIGS. 4 to 6A). FIGS. 9A and 9b are schematic cross-sectional views at the first baseline L1 and the second baseline L2, respectively, of the illumination device 6 shown in FIG. 8. As shown in FIGS. 8 and 9, the light emitting device 1 including the light source 2 and the light flux controlling member 3 is arranged such that its optical axis overlaps the center point O in the opening formed at the center bottom portion 42 of the rectangular cell 40.

Figure 10:
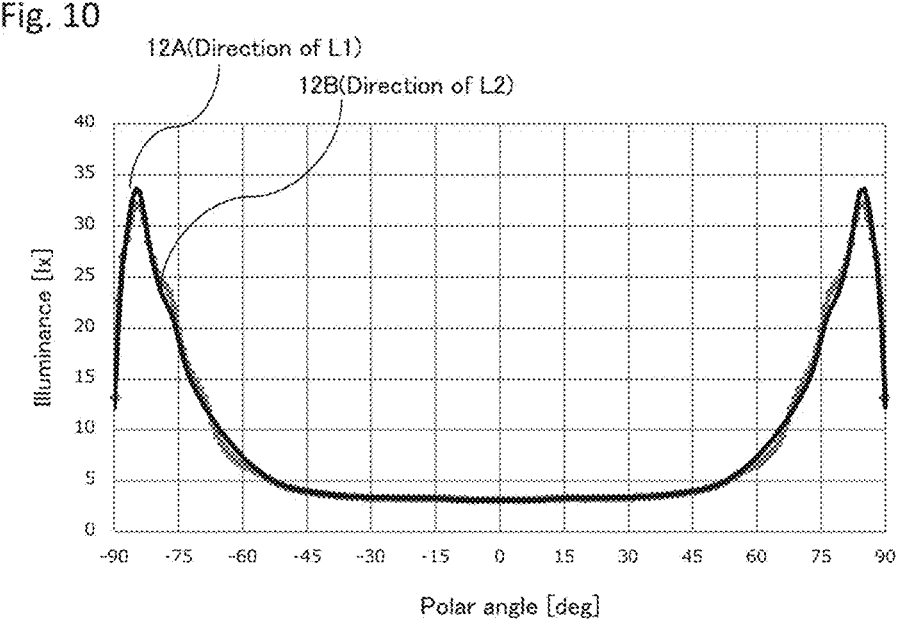
FIG. 10 shows measured values of far-field light distribution curves (directions of the first and second baselines) of the illumination device illustrated in FIG. 8 in a state that a reflection member is removed to leave a light emitting device.
Figure 11:
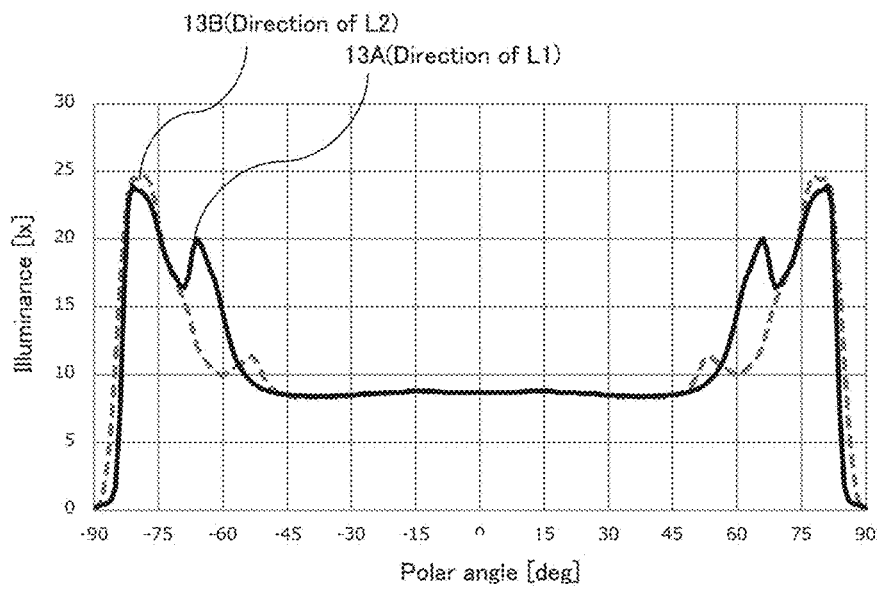
FIG. 11 shows measured values of far-filed light distribution curves (directions of the first and second baselines) of the illumination device shown in FIG. 8.

FIG. 10 shows measured values of far-field light distribution curves (directions of the first and second baselines) of only the light emitting device 1 (the LED light source 2 and the light flux controlling member 3) used in the illumination device 6 shown in FIG. 8, and FIG. 11 shows measured values of far-field light distribution curves (directions of the first and second baselines) of the illumination device 6 shown in FIG. 8. In each of the measurements, the light distribution curve in the cross section along the first baseline L1 and the light distribution curve in the cross section along the second baseline L2 are measured at positions away from the emission center of the LED light source 2 by 100 mm. The vertical axis of FIGS. 10 and 11 indicates illuminance [lx] and the lateral axis thereof indicates measurement results of illuminance at respective emission angles of every one-degree increment from right side 90° to left side 90° when the optical axis direction is supposed to be 0°.

Light distribution curve of the LED light source 2 typically has a peak in its optical axis direction, but the light distribution curve of the light emitting device 1 shown in FIG. 10 has the most intensive sharp peak in the vicinities of ±80° to 85° with respect to the optical axis because the light irradiated in an oblique direction becomes intense by the function of the light flux controlling member 3. In this regard, the peak position may be changed by modifying the configuration of the light flux controlling member 3 depending on the partition size of the divided area (irradiated area) for local dimming control, the distance from the light source to the irradiated plane, or the like. Note that both the LED light source 2 and the light emitting device 1 irradiate a light flux symmetric around its optical axis, so that, in FIG. 10, there is almost no difference between measured value 12A for the light distribution curve in the cross section along the first baseline L1 and measured value 12B for the light distribution curve in the cross section along the second baseline L2, and they are overlapped.

In the light distribution curves of the illumination device 6 of the present invention shown in FIG. 11, in each of measured value 13A (solid line) in the cross section along the first baseline L1 and measured value 13B (dotted line) in the cross section along the second baseline L2, light intensity between peeks at the vicinity of 0° to ±50° with respect to the optical axis is larger than that of the light distribution curves of the light emitting device 1 shown in FIG. 10, showing that the irradiated area is made to be totally bright.

Furthermore, in the measured value 13A (solid line) in the cross section along the first baseline L1, peaks having a wide width are detected near ±50° to 80°, and in particular, illuminance is increased in the ranges of ±60° to 76° as compared with measured value 13B (dotted line) in the cross section along the second baseline L2. For example, the light emitted at ±60° to 76° with respect to the optical axis from the center point O reaches the positions of about 13.86 mm to 32.09 mm from the optical axis in the irradiated plane away from reference surface S by 8 mm in the optical axis direction. When the rectangular irradiated area of 50 mm×50 mm is formed in the irradiated plane away from reference surface S by 8 mm in the optical axis direction, although the distance from the center (optical axis) of the rectangle to the midpoint of each side is 25 mm, the distance from the center (optical axis) of the rectangle to each vertex becomes about 35.36 (25 mm×$2^{1/2}$) mm. The illumination device 6 (rectangular cell 40) of the example makes it possible to make the vicinities of respective rectangular vertices in the irradiated area brighter by increasing the illuminance in the range from ±60° to 76° in the direction of the first baseline L1 oriented to vertex A.

Furthermore, in the illumination device 6 (rectangular cell 40) of the example, the height h(A) of vertex A of the rectangular cell 40 from reference surface S is 6.83 mm, and the light of not less than 79° with respect to the optical axis among the light emitted from the center point O to the direction of the first baseline L1 is incident on the inclined portion 44 of the rectangular cell 40 and reflected by the inclined portion 44. In contrast, the height h(B) of the midpoint B of side M of the rectangular cell 40 from reference surface S is 4.5 mm, and the light of not less than 79.8° with respect to the optical axis among the light emitted from the center point O to the direction of the second baseline L2 is incident on the inclined portion 44 of the rectangular cell 40 and reflected by the inclined portion 44. In this manner, in the illumination device 6 of the example, the height of vertex A of the rectangular cell 40 is made higher than the midpoint B of side M to make the light of the comparable range be reflected by the reflection member also to the light emitted in the direction of vertex A, making it possible to improve uniformity in the irradiated area.

In this manner, the example of the illumination device of the present invention makes it possible to increase light intensity of light for covering brightness at corners that are likely to be dark in the irradiated area of a rectangular shape by providing the reflection area. Furthermore, the example of the illumination device of the present invention makes it possible to effectively reflect the light in the vertex direction by increasing the height of the vertex of the rectangular cell, making it possible to increase light intensity of light for covering brightness at corners that are likely to be dark in the irradiated area of a rectangular shape.

Figure 12:
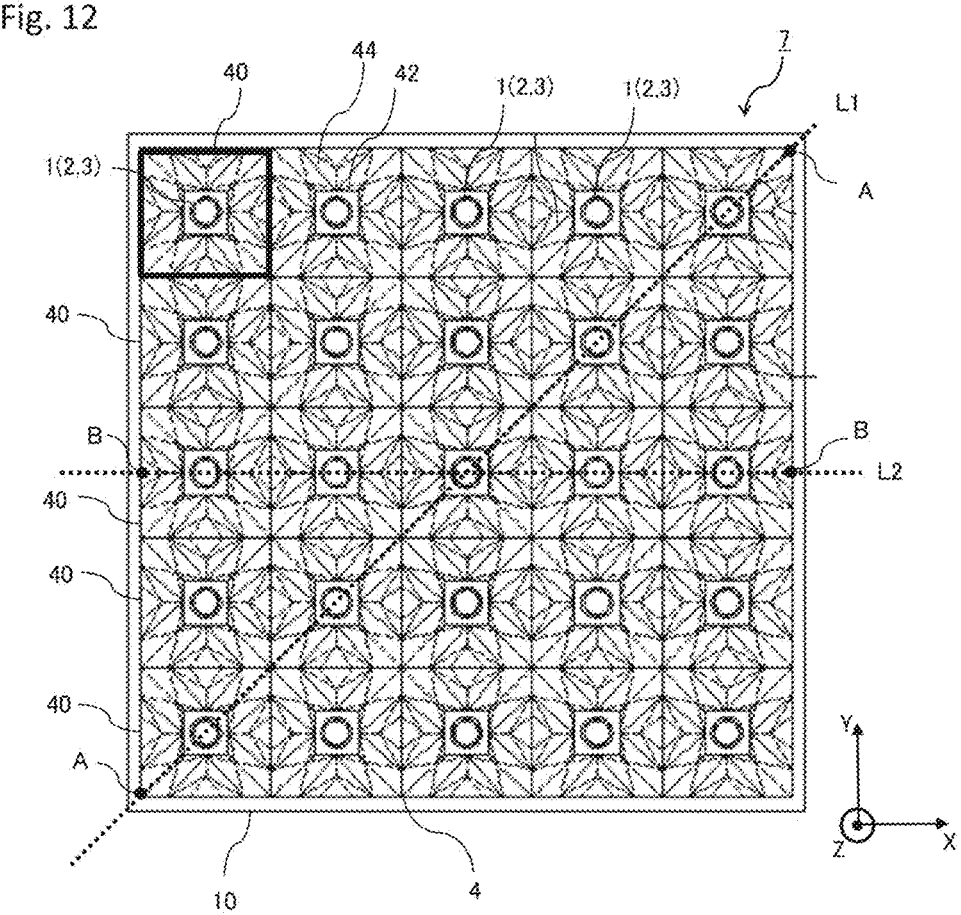
FIG. 12 is a schematic plan view of an example of a surface light source device of the present invention in which a diffusion member is omitted.
Figure 13A:
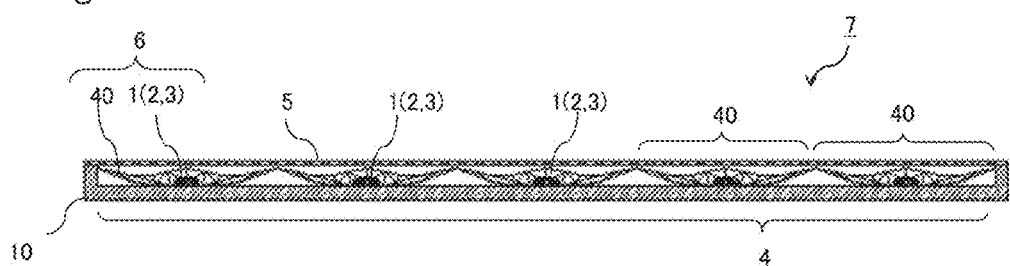
FIGS. 13A and FIG. 13B are schematic cross-sectional views along a first baseline L1 and a second baseline L2, respectively, of the surface light source device shown in FIG. 12.
Figure 13B:
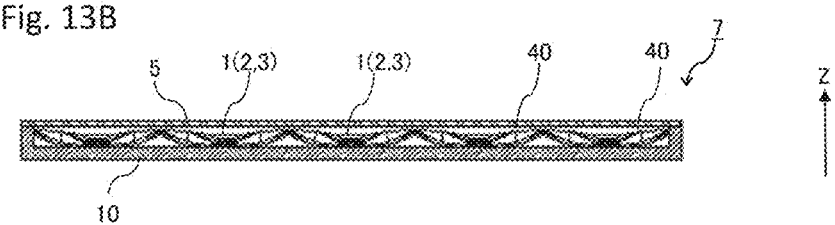

FIG. 12 is a schematic plan view of an example of the surface light source device 7 of the present invention. For convenience, the diffusion member 5 (see FIGS. 13A and 13B) of the surface light source device is omitted. FIG. 13A is a schematic cross-sectional view at the first baseline L1 and FIG. 13B is a schematic cross-sectional view at the second baseline L2 of the surface light source device 7 shown in FIG. 12.

As shown in FIGS. 12 and 13, the surface light source device 7 is a device including the reflection member 4 including the rectangular cells 40 shown in FIGS. 4 to 6B arrayed in a matrix of five rows and five columns, the light emitting device 1 arranged at the center of each rectangular cell 40, and the diffusion member 5 provided on the emission side (Z axis side) of a light flux. The illumination device 6 including the light emitting device 1 and the reflection member 4 is stored in a housing 10. The distance from the substrate surface (reference surface S) mounting thereon the light emitting device 1 to the surface of the diffusion member 5 on the light source side (irradiated plane) is 8 mm.

The light emitting device 1 includes the light source 2 and the light flux controlling member 3, and the illumination device 6 includes the light emitting device 1 and the rectangular cell 40. The configurations of the rectangular cell 40 and the illumination device 6 are as described in FIG. 4 to FIG. 9B. Hereinafter, optical properties of the reflection member of the present invention is confirmed using the surface light source device (FIG. 14B) using the reflection member of the present invention and a comparative example (FIG. 14A).

Figure 14A:
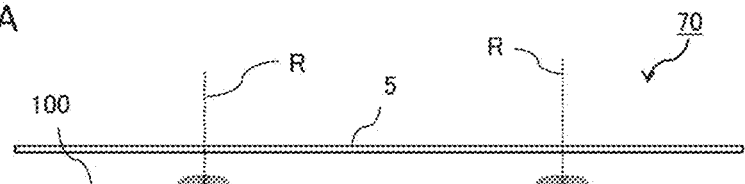
FIG. 14A is a schematic cross-sectional view of a surface light source device including a flat reflection member (comparative example)
Figure 14B:
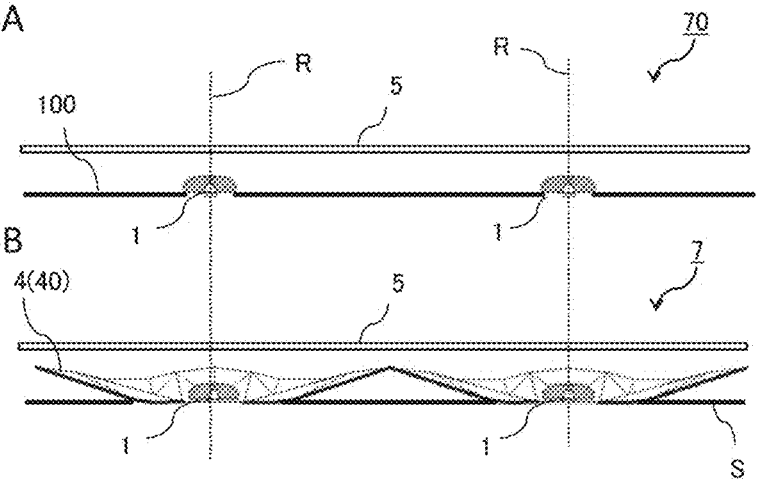
FIG. 14B is a schematic cross-sectional view of the surface light source device including the reflection member shown in FIGS. 4 to 6B (example)

FIG. 14A is a schematic cross-sectional view of a surface light source device 70 including a flat reflection member 100 (comparative example), and FIG. 14B is a schematic cross-sectional view of the surface light source device 7 that is a modification of the surface light source device in FIGS. 12 and 13 to have a 2×2 array (example).

The surface light source device 70 (comparative example) shown in FIG. 14A is made for comparison with the surface light source device 7 (example) of the present invention, and is different in that the light emitting device 1 is provided on the flat reflection member 100, and the configuration, the arrangement distance, etc. of the light emitting device 1 are same as those of the surface light source device 7 in FIG. 14B.

Figure 15:
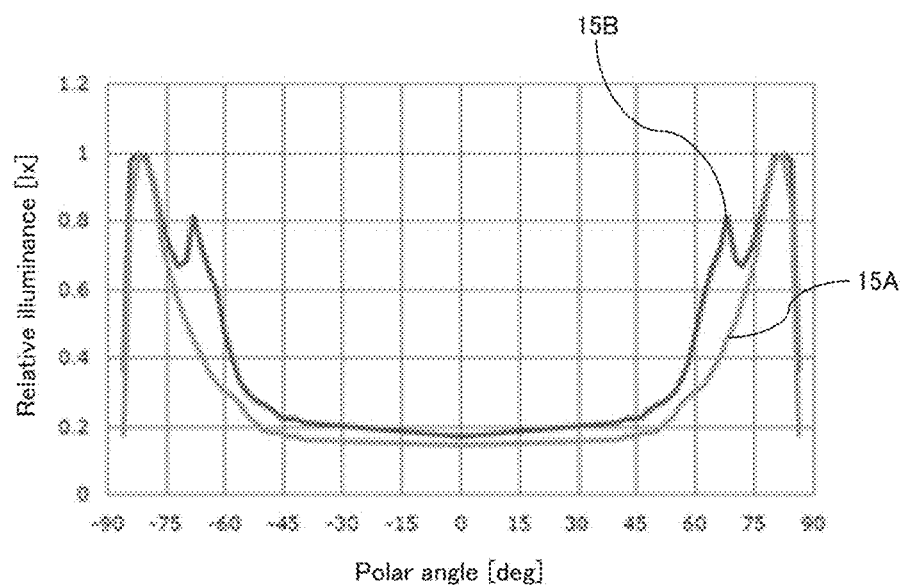
FIG. 15 shows measured values of a near-field light distribution curve (direction of a first baseline) per one light of each of the surface light source devices illustrated in FIGS. 14A and 14B in a state that a diffusion member is removed to leave an illumination device.

FIG. 15 shows a measured value for a near-field light distribution curve (direction of the first baseline L1) per one light (illumination device) in which the diffusion member 5 is removed from each of the surface light soured devices 70, 7 shown respectively in FIGS. 14A and 14B. Each of the measurements is a measurement result of illuminance at emission angles of every-one degree increment from right side 90° to left side 90° when optical axis direction in the cross section along the first baseline L1 is supposed to be 0° at the position away from the emission center of the LED light source 2 by 150 mm. The horizontal axis of FIG. 15 indicates radiation angle, and the vertical axis of FIG. 15 indicates relative illuminance when the maximum value is supposed to be 1. Light distribution curve 15B of the illumination device (surface light source device 7 excluding the diffusion member 5) of the example provides, in the angle ranges from ±60° to 76°, the illuminance relatively larger than the illuminance of light distribution curve 15A of the illumination device (surface light source device 70 excluding the diffusion member 5) using the flat reflection member 100. As described above, when the rectangular irradiated area of 50 mm×50 mm is formed in the irradiated plane away from reference surface S by 8 mm in the optical axis direction, the distance from the center (optical axis) of the rectangle to each vertex becomes about 35.36 mm, making it possible to make the vicinities of respective rectangular vertices in the irradiated area brighter by increasing the illuminance in the range from ±60° to 76° in the direction of the first baseline L1 oriented to vertex A.

Figures 16A, 16B:
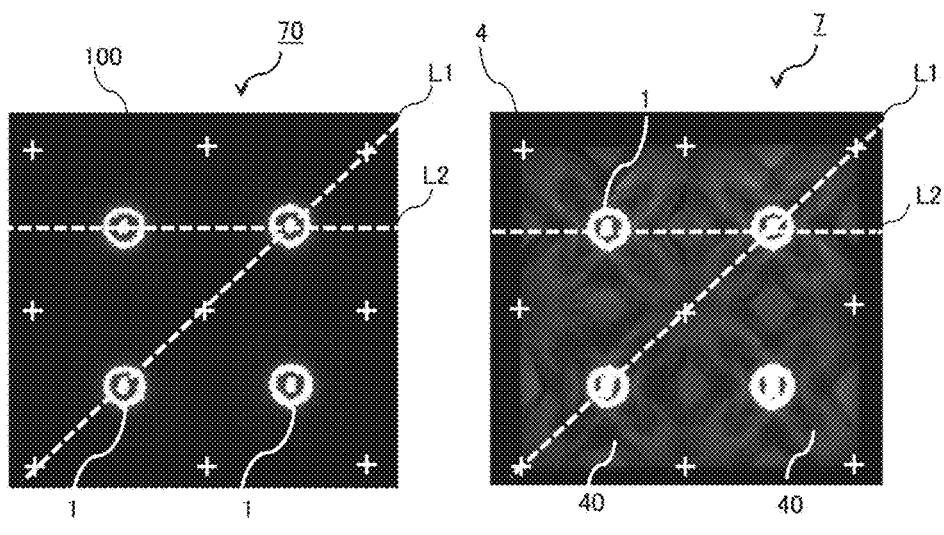
FIG. 16A and FIG. 16B are plan photographs illustrating lighting states of each of the surface light source devices illustrated in FIGS. 14A and 14B in a state that a diffusion member is removed to leave an illumination device.
Figure 17A:
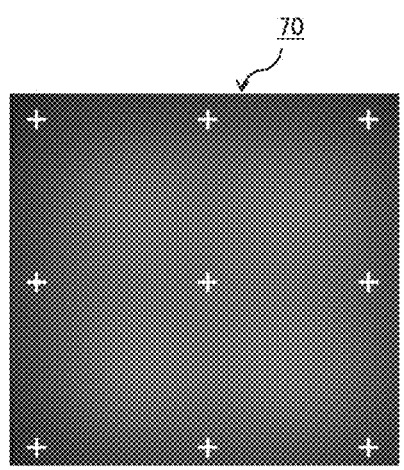
FIG. 17A and FIG. 17B are plan photographs illustrating lighting states of the surface light source devices (including the diffusion member) shown in FIGS. 14A and 14B, respectively.
Figure 17B:
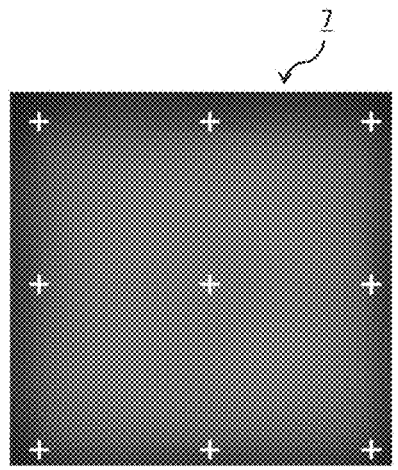
Figure 18A:
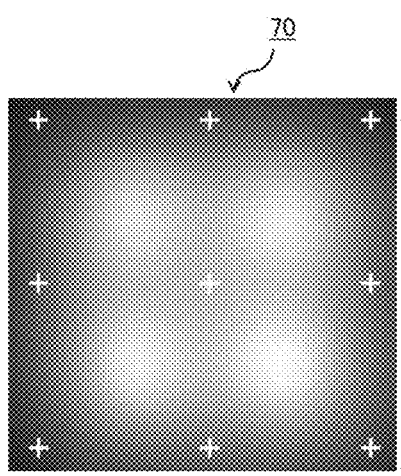
FIG. 18A and FIG. 18B show luminance distributions in lighting states of the surface light source devices (including the diffusion member) shown in FIGS. 14A and 14B, respectively.
Figure 18B:
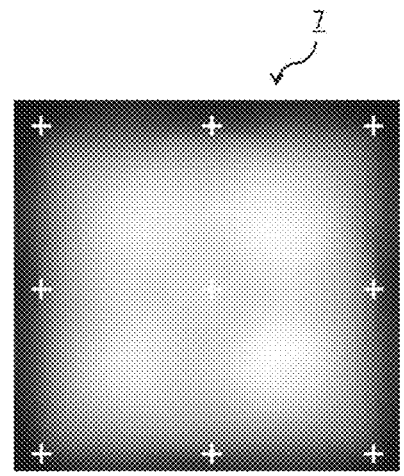

FIGS. 16A and 16B are plane photographs of a lighting state of the surface light source devices 70, 7 (excluding diffusion member 5) shown in FIGS. 14A and 14B, respectively. FIGS. 17A and 17B are plane photographs of a lighting state of the surface light source devices 70, 7 (including diffusion member 5) shown in FIGS. 14A and 14B, respectively. FIGS. 18A and 18B are diagrams illustrating luminance distributions of the surface light source devices 70, 7 (including diffusion member 5) shown in FIGS. 14A and 14B, respectively. FIGS. 19A and 19B are diagrams emphasizing unevenness of the diagrams shown in FIGS. 18A and 18B, respectively, by subjecting thereto image processing. In FIG. 16B to FIG. 19B, for description, the positions of the vertices of each rectangular cell 40 are indicated by cross markers. Also in FIG. 16A to FIG. 19A, for comparison, the positions corresponding to the vertices of the rectangular cell 40 shown in FIG. 16B, etc. are indicated by cross markers in the same manner.

The surface light source device 7 of the example is a surface light source that provides illumination having a brightness with no unevenness due to the rectangular cells arrayed in a matrix manner as compared with the comparative example in FIGS. 18A and 19A as is apparent from, for example, the luminance distribution in lighting states in FIGS. 18B and 19B, and almost no boundary of the rectangular cells can be seen. Furthermore, as is apparent from comparison between FIG. 19A and FIG. 19B, the rectangular cell of the example proves that an irradiated area of a relatively precise rectangular shape can be provided.

Figure 20:
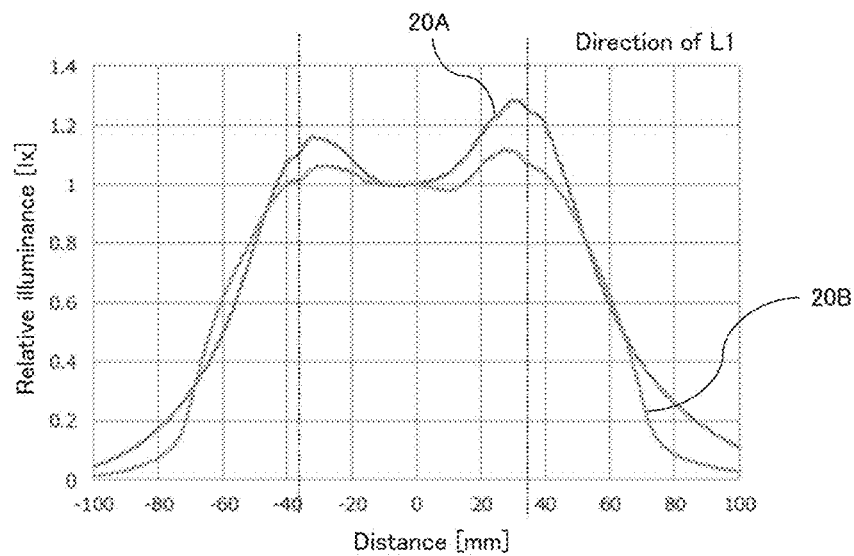
FIG. 20 shows measured values of a cross-sectional luminance distribution along the direction of the first baseline L1 in a lighting state of each of the surface light source devices (each including the diffusion member) shown in FIGS. 14A and 14B.
Figure 21:
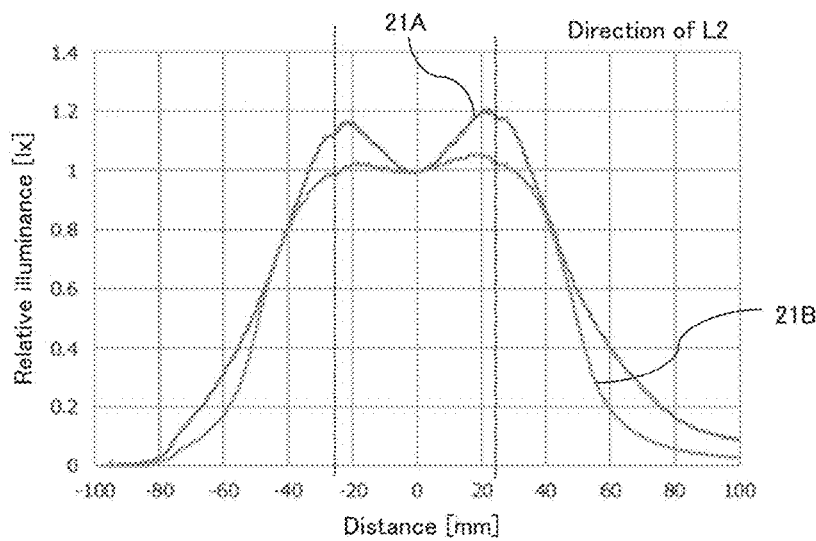
FIG. 21 is a diagram illustrating measured values of a cross-sectional luminance distribution along the direction of the second baseline L2 in a lighting state of the surface light source devices (each including the diffusion member) shown in FIGS. 14A and 14B, respectively.

FIG. 20 shows measured values of luminance distribution on the diffusion member 5 in the direction of the first baseline L1 of the surface light source devices 70, 7 (four light lighting) shown in FIGS. 14A and 14B, respectively. FIG. 21 shows measured values of luminance distribution on the diffusion member 5 in the direction of the second baseline L2 of the surface light source devices 70, 7 (four light lighting) shown in FIGS. 14A and 14B, respectively.

Measured values 20A and 21A indicate luminance distribution in the cross sections at the first baseline L1 and the second baseline L2, respectively, according to the surface light source device 70 (comparative example). The measured values 20B and 21B indicate luminance distribution in the cross sections at the first baseline L1 and the second baseline L2, respectively, according to the surface light source device 7 of the example. The lateral axis in FIG. 20 corresponds to the position at the cross section in the direction of the first baseline L1, and the position of 0 mm corresponds to the position of the center of the two light emitting devices 1 adjacent in the direction of the first baseline L1. The lateral axis in FIG. 21 corresponds to the position at the cross section in the direction of the second baseline L2, and the position of 0 mm corresponds to the position of the center of the two light emitting devices 1 adjacent in the direction of the second baseline L2. The vertical axis in FIGS. 20 and 21 indicates relative luminance on the diffusion member 5 (irradiated plane), and is a numerical value standardized as the luminance at the position 0 mm being 1. The dotted line parallel to the vertical axis shown in FIGS. 20 and 21 corresponds to the position of the light emitting device 1 (optical axis).

As is apparent from FIGS. 20 and 21, the surface light source device 7 of the example can make the luminance near vertex of the rectangular cell (position 0 mm) nearly equal to the luminance at the position of the light emitting device 1 (see dotted line) as compared with the case of using the flat reflection member (comparative example). This results in averaging, to some extent, the luminance in the divided area of the irradiated plane corresponding to the rectangular cell, making it possible to provide illumination having no unevenness in brightness.

Figure 22A:
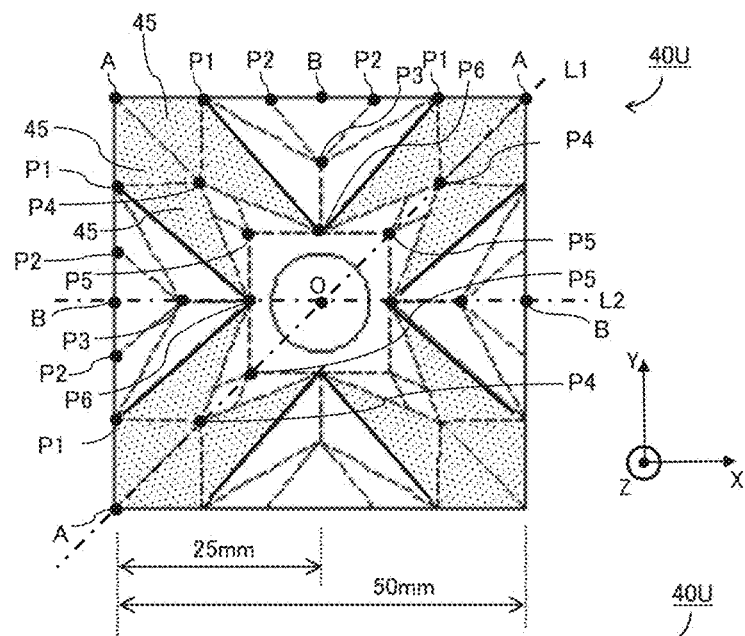
FIG. 22A, FIG. 22B, and FIG. 22C show a first modification of the rectangular cell.

FIG. 22A to FIG. 24C illustrate modifications of the rectangular cell. In FIGS. 22A, 23A and 24A, the mountain-fold boundary (boundary in which the angle between surfaces of both planes (two adjacent contact planes in the case of curved surface) is not less than 180°) is shown by solid line and the valley-fold boundary (boundary in which the angle between surfaces of both planes is less than 180°) is shown by dotted line among the boundaries of plane areas. The reflection areas 45 are shaded.

Figure 22B:
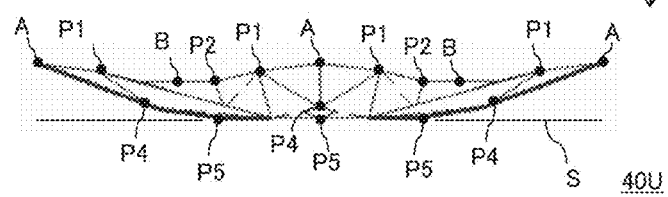
Figure 22C:
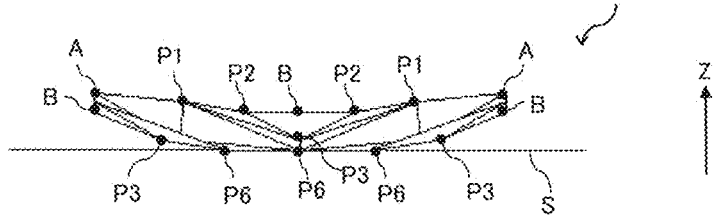

FIG. 22 shows a first modification of the rectangular cell, in which FIG. 22A is a schematic plan view of a rectangular cell 40U, and FIGS. 22B and 22C are schematic cross-sectional view parallel to the first and second baselines of the rectangular cell 40U, respectively. The rectangular cell 40U shown in FIG. 22 is a partial modification of the rectangular cell 40 shown in FIG. 5 in shape, and the position and height of the point P4 are modified to satisfy the relation of h(P4)=1.25 mm. That is, in the example shown in FIG. 5, the relations of h(P3)>h(P4), and h(P3)=1.25 mm, h(P4)=0.36 mmm are satisfied, but in the example shown in FIG. 22, the relation of h(P3)=h(P4)=1.25 mm is satisfied, which is different points in design. In the example shown in FIG. 22, the reflection area 45 is a segment with vertices of the point A, the point P1, and the point P4 that are portions of the vertex-portion inclined surface and a segment with vertices of the point P1, the point P4, and the point P6 that are portions of the side-portion inclined surface. In the example shown in FIGS. 22A to 22B, the border connecting point P1 and P6 is a mountain-fold boundary, and one mountain fold boundary inclined to reflect the light from the center O to vertex A close thereto in plan view is provided in the area of the plan view triangle AOB to form a portion of the reflection area 45. In the example shown in FIG. 22, the design can be provided that matches the surface light source device in which the distance from substrate surface S to the irradiated plane (inner surface of the diffusion member) is 8 mm without modifying the remaining sizes, and it is confirmed that the similar problems can be solved.

Figure 23A:
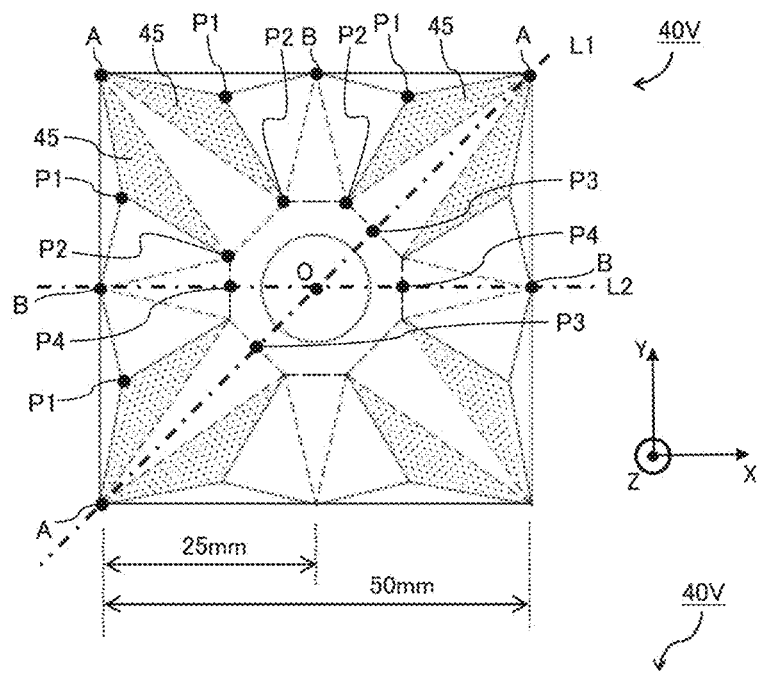
FIG. 23A, FIG. 23B, and FIG. 23C show a second modification of the rectangular cell.
Figure 23B:
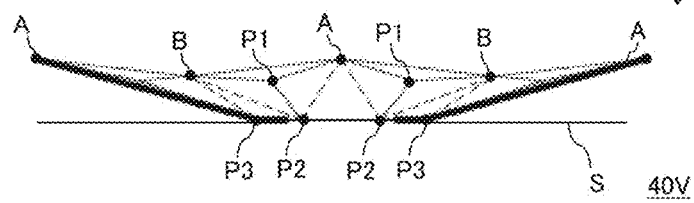
Figure 23C:
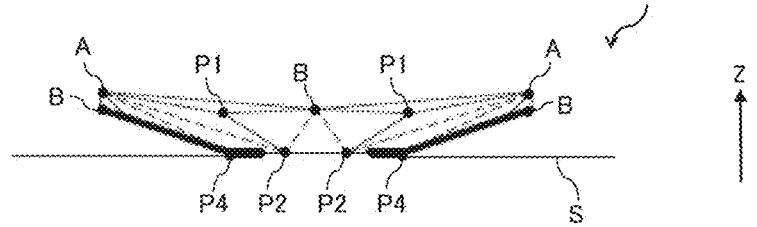

FIG. 23 shows a second modification of the rectangular cell, in which FIG. 23A is a schematic plan view of a rectangular cell 40V, and FIGS. 23B and 23C are schematic cross-sectional views parallel to the first and second baselines of the rectangular cell 40V, respectively. The rectangular cell 40V shown in FIG. 23 has a center bottom portion of an octagonal shape, and an inclined triangle surface having a constant inclined angle is formed toward the vertex A or the midpoint B from each side of the octagon, and a triangular pyramid is provided between the inclined triangle surfaces. In FIG. 23, an inclined portion is composed of three points (point A, point B, point P1) having different heights from reference surface S (center bottom portion), and the reflection area 45 is not provided in the vertex-portion inclined surface (triangle segment of the point A, the point P2, the point P2), and is provided in only the side-portion inclined surface. The height of each point from the reference surface S (the center bottom portion) in the rectangular cell 40V shown in FIG. 23 satisfies the relation of h(A)=7.0 mm, h(B)=5.0 mm, h(P1)=4.5 mm, h(P2)=h(P3)=h(P4)=h(PO)=0.0 mm. In this manner, in the rectangular cell 40V shown in FIG. 23, the triangular pyramid having a bottom surface formed by using the vertex A, the midpoint B, and the point P2 and having the vertex that is the point P1 is formed in the side-portion inclined surface, and the segment with vertices of the vertex A, the point P1, and the point P2, which is one of the surfaces of the triangular pyramid, is used as the reflection area 45. In FIG. 23, the boundary connecting the vertex A and the point P1, the boundary connecting the point P1 and the midpoint B, and the boundary connecting the point P1 and the point P2 are mountain-fold boundaries, and two mountain-fold boundaries inclined to reflect the light from the center O to the vertex A close thereto in plan view are provided in the area of the plan view triangle AOB (boundary of the vertex A to the point P1, boundary of the point P1 to the point P2). Furthermore, as is apparent from the cross-sectional view of FIG. 23B, the inclined angle of the vertex-portion inclined surface (triangle segment of the point A, the point P2, the point P2) is constant. Furthermore, according to FIG. 23C, the inclined angle is constant also in the cross section parallel to the second baseline.

Figure 24A:
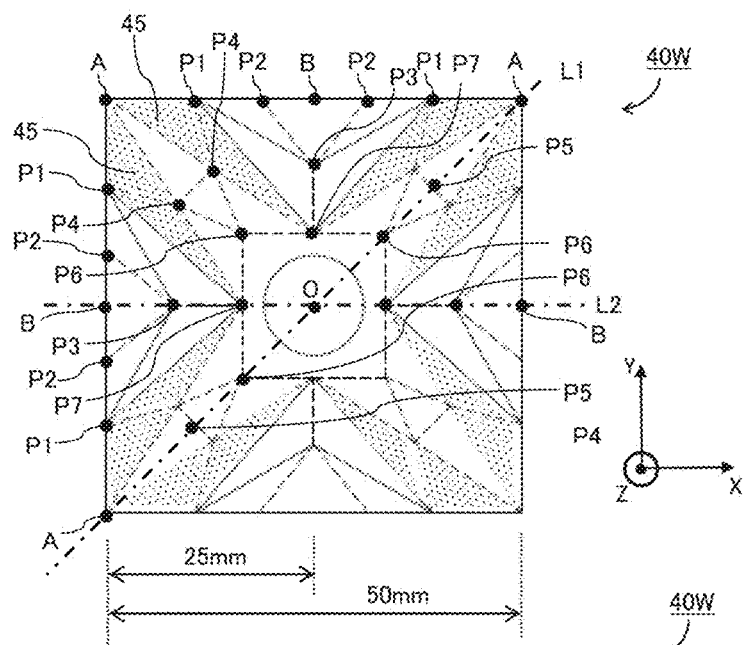
FIG. 24A, FIG. 24B, and FIG. 24C show a third modification of the rectangular cell.
Figure 24B:
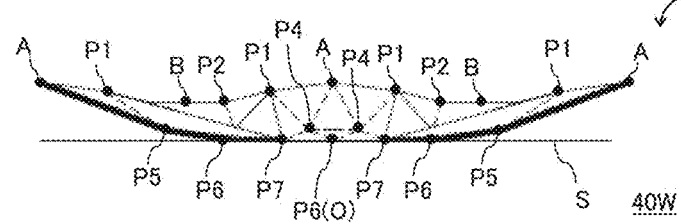
Figure 24C:
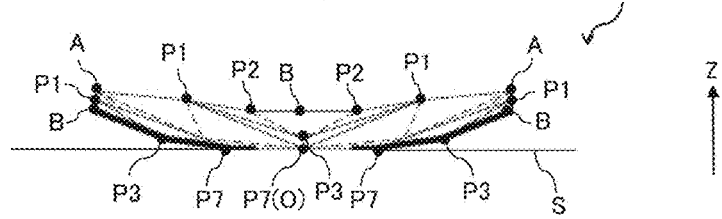

FIG. 24 shows a third modification of the rectangular cell, in which FIG. 24A is a schematic plan view of a rectangular cell 40W and FIGS. 24B and 24C are schematic cross-sectional views parallel to the first and second baselines of the rectangular cell 40W, respectively. In the rectangular cell 40W shown in FIG. 24, the reflection area 45 is not provided in the vertex-portion inclined surface (segment surrounded by the point A, the point P4, the point P4, the point P6), and is provided only in the side-portion inclined surface. The height of each point from reference surface S (center bottom portion) of the rectangular cell 40W shown in FIG. 24 satisfies h(A)=6.83 mm, h(P1)=5.83 mm, h(P2)=h(B)=4.5 mm, h(P3)=1.25 mm, h(P4)=h(P5)=1.18 mm, h(P6)=h(P7)=h(PO)=0.00 mm. In the rectangular cell 40W shown in FIG. 24, the reflection area 45 is a segment with vertices of the point A, the point P1, and point the P4 that is a portion of the side-portion inclined surface, and is a segment with vertices of the point P1, the point P4, and the point P7 that is a portion of the side-portion inclined surface. In FIG. 24, the boundary connecting the point P1 and the point P7, and the boundary connecting the point P1 and the point P3 are mountain-fold boundaries, and one mountain-fold boundary inclined to reflect the light from the center O to the vertex A close thereto in plan view is provided in the area of the plan view triangle AOB (boundary of the point P1 to the point P7) to from a portion of the reflection area 45. Furthermore, as is apparent from the cross-sectional view of FIG. 24B, the inclined angle from the point 6 to the point 5 is formed to be small and the inclined angle from the point P5 to the vertex A is formed to be large to configure an inclined surface whose angle sequentially increases. Furthermore, according to FIG. 24C, also in the cross section parallel to the second baseline, an inclined surface whose angle sequentially increase is composed of the inclined surface (the point P7 to the point P3) having a small inclined angle and the inclined surface (the point P7 to the midpoint B) having a large inclined angle also at the cross section parallel to the second baseline.

REFERENCE NUMERALS 1 light emitting device
2 light source
3 light flux controlling member
4 reflection member
5 diffusion member
6 illumination device
7 surface light source device
40 polygonal cell (rectangular cell)
42 center bottom portion
44 inclined portion
45 reflection area
46 vertex-portion inclined surface
48 side-portion inclined surface
50 irradiated plane

What is claimed is:
1. A reflection member for reflecting light emitted from a light source, comprising:
at least one polygonal cell of a polygonal shape in plan view, which has:
a center bottom portion on which the light source is arranged; and
an inclined portion around the center bottom portion which is inclined and higher in cross-sectional view than the center bottom portion; wherein
on at least a portion of the inclined portion, a reflection area comprising a protruding portion configured to reflect some of the light emitted from the light source in a direction toward a vertex arranged proximate to the reflection area in plan view is provided, the protruding portion having a height intermediate the vertex and the center bottom portion in cross-sectional view.

2. The reflection member according to claim 1, wherein at least one reflection area is provided on the inclined portion in an area of a plan view triangle AOB defined by three vertices, including a vertex A of the polygonal cell, a center O of the polygonal cell, and a midpoint B of a side adjacent to the vertex A of the polygonal cell, and
the reflection area includes a reflection surface inclined to be lower toward a side AO of the plan view triangle AOB.

3. The reflection member according to claim 2, wherein the inclined portion has a vertex-portion inclined surface including the side AO and a side-portion inclined surface provided between two of the vertex-portion inclined surfaces, and
the reflection area is provided on the side-portion inclined surface.

4. The reflection member according to claim 2, wherein the inclined portion has a vertex-portion inclined surface including the side AO and a side-portion inclined surface provided between two of the vertex-portion inclined surfaces, and
the reflection area is provided on the vertex-portion inclined surface.

5. The reflection member according to claim 1, wherein a position of a vertex of the polygonal cell is higher than a position of a midpoint of a side of the polygonal cell.

6. The reflection member according to claim 1, wherein the reflection member includes a plurality of the polygonal cells, and
an outer rim of each one of the polygonal cells is adjacent to an outer rim of another of the polygonal cells.

7. An illumination device, comprising:
a light source; and
the reflection member according to claim 1.

8. The illumination device according to claim 7, comprising a light flux controlling member for controlling light emitted from the light source to be a light flux of a predetermined light distribution state.

9. A surface light source device, comprising:
the illumination device according to claim 7; and
a diffusion member provided on a light emission side of the illumination device.

10. A display device, comprising:
the surface light source device according to claim 9; and
an illuminated member which is irradiated with light from the surface light source device.

11. Electronic equipment, comprising the display device according to claim 10 as a display unit.

12. The reflection member according to claim 3, wherein the inclined portion has a vertex-portion inclined surface including the side AO and a side-portion inclined surface provided between two of the vertex-portion inclined surfaces, and the reflection area is provided on the vertex-portion inclined surface.

13. The reflection member according to claim 2, wherein a position of a vertex of the polygonal cell is higher than a position of a midpoint of a side of the polygonal cell.

14. The reflection member according to claim 3, wherein a position of a vertex of the polygonal cell is higher than a position of a midpoint of a side of the polygonal cell.

15. The reflection member according to claim 4, wherein a position of a vertex of the polygonal cell is higher than a position of a midpoint of a side of the polygonal cell.

16. The reflection member according to claim 12, wherein a position of a vertex of the polygonal cell is higher than a position of a midpoint of a side of the polygonal cell.

17. A surface light source device, comprising:
   the illumination device according to claim 8; and
   a diffusion member provided on a light emission side of the illumination device.

18. A display device, comprising:
   the surface light source device according to claim 17; and
   an illuminated member which is irradiated with light from the surface light source device.

19. Electronic equipment, comprising the display device according to claim 18 as a display unit.

* * * * *